(12) United States Patent
Liu et al.

(10) Patent No.: US 8,508,576 B2
(45) Date of Patent: Aug. 13, 2013

(54) REMOTE PRESENTING SYSTEM, DEVICE, AND METHOD

(75) Inventors: Yuan Liu, Shenzhen (CN); Jiaoli Wu, Shenzhen (CN); Guangyao Zhao, Shenzhen (CN); Jing Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 118 days.

(21) Appl. No.: 13/273,668

(22) Filed: Oct. 14, 2011

(65) Prior Publication Data
US 2012/0033030 A1 Feb. 9, 2012

Related U.S. Application Data

(63) Continuation of application No. PCT/CN2010/071763, filed on Apr. 14, 2010.

(30) Foreign Application Priority Data

Apr. 14, 2009 (CN) .......................... 2009 1 0106662

(51) Int. Cl.
*H04N 7/15* (2006.01)
(52) U.S. Cl.
USPC .................. 348/14.08; 348/14.09; 348/14.12; 348/14.16
(58) Field of Classification Search
USPC .................. 348/14.01–14.16; 370/260–261; 709/204–205; 715/753
See application file for complete search history.

(56) References Cited

U.S. PATENT DOCUMENTS

| | | | |
|---|---|---|---|
| 5,572,248 | A | 11/1996 | Allen |
| 5,751,337 | A | 5/1998 | Allen |
| 6,160,573 | A | 12/2000 | Allen |
| 6,445,405 | B1 | 9/2002 | Allen |
| 6,624,841 | B1 | 9/2003 | Jullien |

(Continued)

FOREIGN PATENT DOCUMENTS

| | | |
|---|---|---|
| CN | 1257631 A | 6/2000 |
| CN | 1586074 A | 2/2005 |

(Continued)

OTHER PUBLICATIONS

First Office Action of related Chinese Application No. 200910106662.6 mailed Aug. 3, 20102.

(Continued)

*Primary Examiner* — Melur Ramakrishnaiah
(74) *Attorney, Agent, or Firm* — Brinks Hofer Gilson & Lione

(57) ABSTRACT

A remote presenting system, includes: a plurality of displays, configured to display a remote image; an audio output apparatus, configured to output remote audio information; a multimedia communication terminal, configured to process and control audio/video information obtained by a local end and audio/video information sent by a remote end; a plurality of video cameras, configured to shoot a local video image and send the shot video image to the multimedia communication terminal to be processed; an audio collection apparatus, configured to collect local audio information, and send the collected audio information to the multimedia communication terminal; and a plurality of user locations, corresponding to the plurality of video cameras respectively, and respectively being in an approximately perpendicular relationship with optic axes of camera lenses of the plurality of video cameras.

18 Claims, 20 Drawing Sheets

(56) References Cited

U.S. PATENT DOCUMENTS

| | | |
|---|---|---|
| 2003/0020805 A1 | 1/2003 | Allen |
| 2003/0090564 A1 | 5/2003 | Strubbe |
| 2004/0100553 A1 | 5/2004 | Allen |
| 2007/0120954 A1 | 5/2007 | Allen |
| 2008/0246834 A1 | 10/2008 | Lunde |
| 2009/0207233 A1* | 8/2009 | Mauchly et al. ........... 348/14.09 |
| 2009/0207234 A1* | 8/2009 | Chen et al. ................ 348/14.09 |

FOREIGN PATENT DOCUMENTS

| | | |
|---|---|---|
| CN | 101534413 A | 9/2009 |
| JP | 2009055094 | 3/2009 |
| WO | WO01/01685 A1 | 1/2001 |
| WO | WO2007/123881 A2 | 11/2007 |
| WO | WO2007/123946 A2 | 11/2007 |
| WO | WO2007/123947 A2 | 11/2007 |
| WO | WO2007/123960 A2 | 11/2007 |
| WO | WO2010/118685 A1 | 10/2010 |

OTHER PUBLICATIONS

International Search Report issued in related PCT/CN2010/071763 dated Jul. 22, 2010.

Written Opinion of the International Searching Authority issued in related PCT/CN2010/071763 dated Jul. 22, 2010.

* cited by examiner

REMOTE PRESENTING SYSTEM, DEVICE, AND METHOD

CROSS-REFERENCE TO RELATED APPLICATIONS

This application is a continuation of International Application No. PCT/CN2010/071763, filed on Apr. 14, 2010, which claims priority to Chinese Patent Application No. 200910106662.6, filed on Apr. 14, 2009, both of which are hereby incorporated by reference in their entireties.

FIELD OF THE INVENTION

The present invention relates to the field of multimedia technologies, and in particular, to a remote presenting system, a remote presenting device, and a remote presenting method.

BACKGROUND OF THE INVENTION

A remote presenting technology is a technology for creating an immersive virtual conference environment, and the virtual conference environment fully embodies a user-friendly factor of a participant, and replicates real experiences of the participant as much as possible, so as to greatly increase the degree of acceptance of an end user, which thereby increases a use rate, and improves demands, return on investment and a user satisfaction rate. Compared with a conventional video conference system, the remote presenting system has many advantages, including: providing an image of a true person size, an eye expression communication effect, a more affluent motion, and a precise limb behavior of a remote conference participant; a high-definition, studio-level video, illumination and audio effect; a uniform conference environment, so that the participant feels being located at the same conference site, which thereby ensures experience consistency of different conference sites; and hides conference apparatuses such as a video camera, which thereby reduces the influence on the user.

Wide use of the remote presenting system may bring huge economic benefits, social benefits and ecological benefits. The remote presenting system improves video communication experience to a large extent, and may reduce commercial business in a large scale, which thereby not only decreases business traveling cost so as to avoid journey tiredness of employees, but also accelerates communication and response speed, so as to increase the efficiency of cooperative work at different places. Moreover, the use of transportation vehicles is reduced, so the $CO_2$ emission is greatly decreased, and the routine work becomes more green and environment-friendly.

FIG. 1 is a schematic diagram of a conventional video conference system, and in order to be schematic, only one conference participant is drawn, where 1 is a video camera, 2 is a video communication terminal, 3 is a display, 4 is a conference room desktop, and 5 is a conference participant. In the entire conference hall, the video camera 1, the video communication terminal 2 and the display 3 are placed on a desktop opposite to the conference participant, an image of the conference participant 5 is shot through the video camera 1, the image of the conference participant 5 is coded and transmitted to the communication remote end by the video communication terminal 2, and an image of the communication remote end is represented to the conference participant 5 through the display 3.

During the implementation of the present invention, it is found that the prior art at least has the following disadvantages: (1) a display generally used for presenting is not large in dimension, and a picture is small, so that usually when a content of an entire conference hall is shot, each conference participant is very small in dimension in a picture, and user experience is not good; (2) the resolution of a scene image is usually not high, and an image of the conference participant is not clear enough; (3) the sound is generally played by adopting a speaker of a television, and neither the tone quality nor the sense of immediacy are sufficiently good.

SUMMARY OF THE INVENTION

Embodiments of the present invention provide a remote presenting system, a remote presenting method, and a remote presenting device, so as to solve the problem that conference experience consistency is lacking in a multimedia communication procedure in the prior art.

In an aspect, an embodiment of the present invention provides a remote presenting system, where the system includes:
a plurality of displays, configured to display image information of a multimedia communication remote end;
an audio output apparatus, configured to output audio information of the multimedia communication remote end;
a multimedia communication terminal, connected to the plurality of displays and the audio output apparatus, and configured to process a video signal and an audio signal of the multimedia communication remote end, and display a video image of the remote end through the plurality of displays, output the audio signal of the multimedia communication remote end and process local audio/video data information of a local end through the audio output apparatus, and send the processed audio/video data information to the remote end;
a plurality of video cameras, connected to the multimedia communication terminal, and configured to shoot a video image of a multimedia communication local end, and send the shot video image to the multimedia communication terminal for processing;
an audio collection apparatus, connected to the multimedia communication terminal, and configured to collect audio information of the multimedia communication local end, and send the collected audio information to the multimedia communication terminal; and
a plurality of user locations, corresponding to the plurality of video cameras respectively, in which visual field perpendicular planes of the plurality of user locations are respectively in an approximately perpendicular relationship with optic axes of camera lenses of the plurality of video cameras.

In still another aspect, an embodiment of the present invention further provides a method for implementing a Panning/Tilting/Zooming (PTZ) operation of multiple video cameras in a remote presenting system, where the method includes:
determining a shooting imaging window of a virtual video camera; and
panning or zooming on an image obtained by shooting and stitching of multiple video cameras according to the shooting imaging window, and representing the image obtained through panning or zooming in the shooting imaging window.

In still another aspect, an embodiment of the present invention further provides an apparatus for implementing a PTZ operation of multiple video cameras, where the apparatus includes:
a window determination unit, configured to determine a shooting imaging window of a virtual video camera; and
an execution unit, configured to perform panning or zooming on an image obtained by shooting and stitching of multiple video cameras according to the shooting imaging window, and present the image obtained through panning or zooming in the shooting imaging window.

The technical solutions of the embodiments of the present invention may provide, to a user, an image of a true person size, an eye expression communication effect, a more affluent motion, and a precise limb behavior of a remote conference participant; a high-definition, studio-level video, illumination and audio effect; and a uniform conference environment, so that participants feel being located at the same conference site, which thereby ensures experience consistency of different conference sites.

BRIEF DESCRIPTION OF THE DRAWINGS

To make the technical solutions under the present invention or in the prior art clearer, the accompanying drawings for illustrating the embodiments of the present invention or the prior art are outlined below. Apparently, the accompanying drawings are for the exemplary purpose only, and person skilled in the art may derive other drawings from such accompanying drawings without creative efforts.

DETAILED DESCRIPTION OF THE EMBODIMENTS

The technical solutions of the present invention are clearly and fully described in the following with reference to the accompanying drawings. It is obvious that the embodiments to be described are only a part rather than all of the embodiments of the present invention. All other embodiments obtained by persons skilled in the art based on the embodiments of the present invention without creative effects shall fall within the protection scope of the present invention.

Embodiment 1

Embodiment 1 of the present invention provides a remote presenting system, which includes:

a plurality of displays, configured to display image information of a multimedia communication remote end;

an audio output apparatus, configured to output audio information of the multimedia communication remote end;

a multimedia communication terminal, connected to the plurality of displays and the audio output apparatus, and configured to process a video signal and an audio signal of the multimedia communication remote end, and display a video image of a remote end through the plurality of displays, output the audio signal of the multimedia communication remote end and process audio/video data information of a local end through the audio output apparatus, and send the processed audio/video data information to the remote end;

a plurality of video cameras, connected to the multimedia communication terminal, and configured to shoot a video image of a multimedia communication local end, and send the shot video image to the multimedia communication terminal for processing;

an audio collection apparatus, connected to the multimedia communication terminal, and configured to collect audio information of the multimedia communication local end, and send the collected audio information to the multimedia communication terminal; and a plurality of user locations, corresponding to the plurality of video cameras respectively, where visual field perpendicular planes of the plurality of user locations are respectively in an approximately perpendicular relationship with optic axes of camera lenses of the plurality of video cameras.

Figure 1:
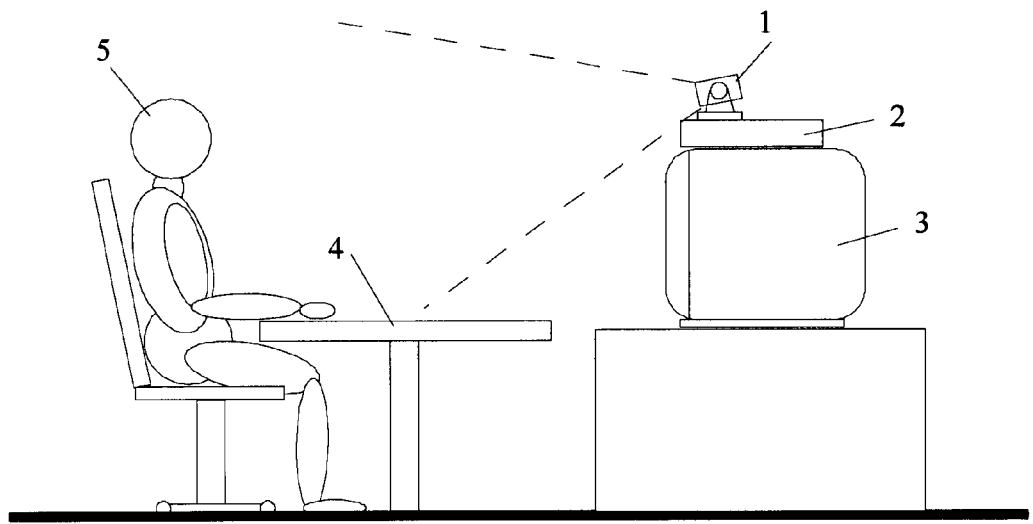
FIG. 1 is a schematic structural diagram of a system performing multimedia communication in the prior art.
Figure 2:
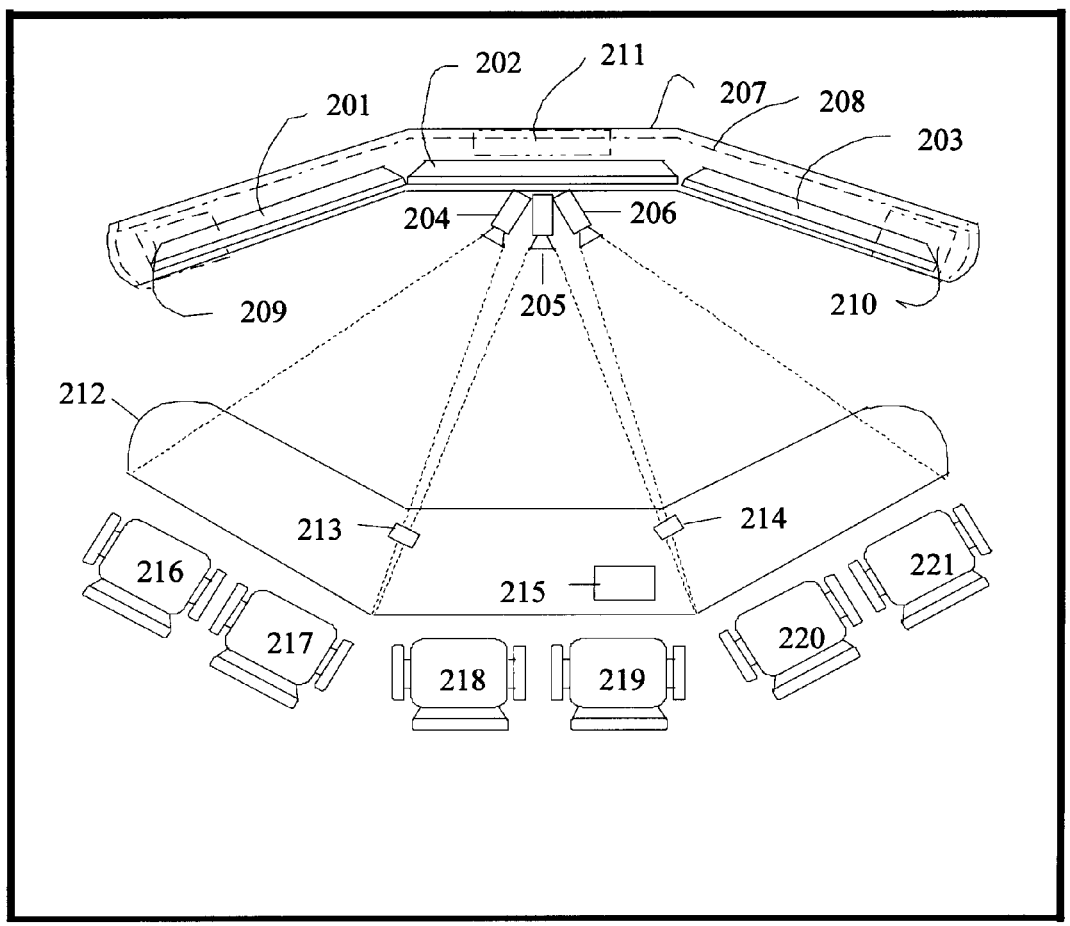
FIG. 2 is a schematic structural diagram of Embodiment 1 of the present invention.

In order to clearly illustrate this embodiment, illustration is made with reference to FIG. 2 in the following description, and a provided remote presenting system includes:

one presenting desktop 207, in which the presenting desktop 207 includes a left part, an intermediate part, and a right part, every two of these three parts are combined in an obtuse angle manner, the left part and the right part are symmetrical with respect to a central axis of the intermediate part, and three displays 201, 202, and 203 configured to display an image of the multimedia communication remote end are placed on the presenting desktop 207;

a multimedia communication terminal 211 and an audio output apparatus accommodated in an interior 208 of the presenting desktop 207, in which the multimedia communication terminal is connected to the three displays and the audio output apparatus, the multimedia communication terminal is configured to process a video signal and an audio signal of the multimedia communication remote end, a video image of a remote end is displayed through the three displays, and the audio signal of the multimedia communication remote end is output through the audio output apparatus;

a left video camera 204, an intermediate video camera 205, and a right video camera 206 placed at an upper frame of an intermediate display 202 of the three displays in a convergence manner, in which the three video cameras 204, 205, and 206 are connected to the multimedia communication terminal 211, and the three video cameras are configured to shoot images of a multimedia communication local end, and send the shot images to the multimedia communication terminal 211 for processing;

one conference table 212 and a plurality of conference chairs 216, 217, 218, 219, 220, and 221 placed opposite to the presenting desktop, in which the conference table is also divided into a left part, an intermediate part, and a right part, every two of these three parts are combined in an obtuse angle manner, the left part and the right part are symmetrical with respect to a central axis of the intermediate part, and every two of the three parts are placed in combination with each other in an obtuse angle manner;

an audio collection apparatus mounted on the conference table 212, in which the audio collection apparatus is connected to the multimedia communication terminal 211, and is configured to collect audio information of a conference participant and send the collected audio information to the multimedia communication terminal 211; and a centralized control apparatus 215 disposed in the middle of the conference table 212, in which the centralized control apparatus 215 is connected to the multimedia communication terminal 211, and is configured to implement control on multimedia communication.

In a specific implementation procedure, the centralized control apparatus 215 is configured to set up or release a multimedia audio/video call before the beginning of multimedia communication and in the process of the multimedia communication, set a system parameter (such as, adjusting the luminance of a display apparatus, adjusting the volume of an audio output apparatus, and setting the number of conference participants of the multimedia communication), adjust the lighting of the conference room, control lifting of window curtains of the conference room. It may be understood that, other control further exists in the multimedia communication procedure, which is usually finished by the centralized control apparatus, and details are not described herein again.

An embodiment of the present invention provides a technical implementation solution of a remote presenting system, so as to have a uniform conference environment, so that participants feel they are located at the same conference site, which thereby ensures experience consistency of different conference sites.

The displays 201, 202, and 203 in the embodiment adopt large dimension displays which may display an image in a true person size, so that a user has a feeling of being personal on the scene in the video communication procedure, and a local conference participant and a remote conference participant hold a conference in the same conference room, which thereby brings better experience to the users.

Figure 3:
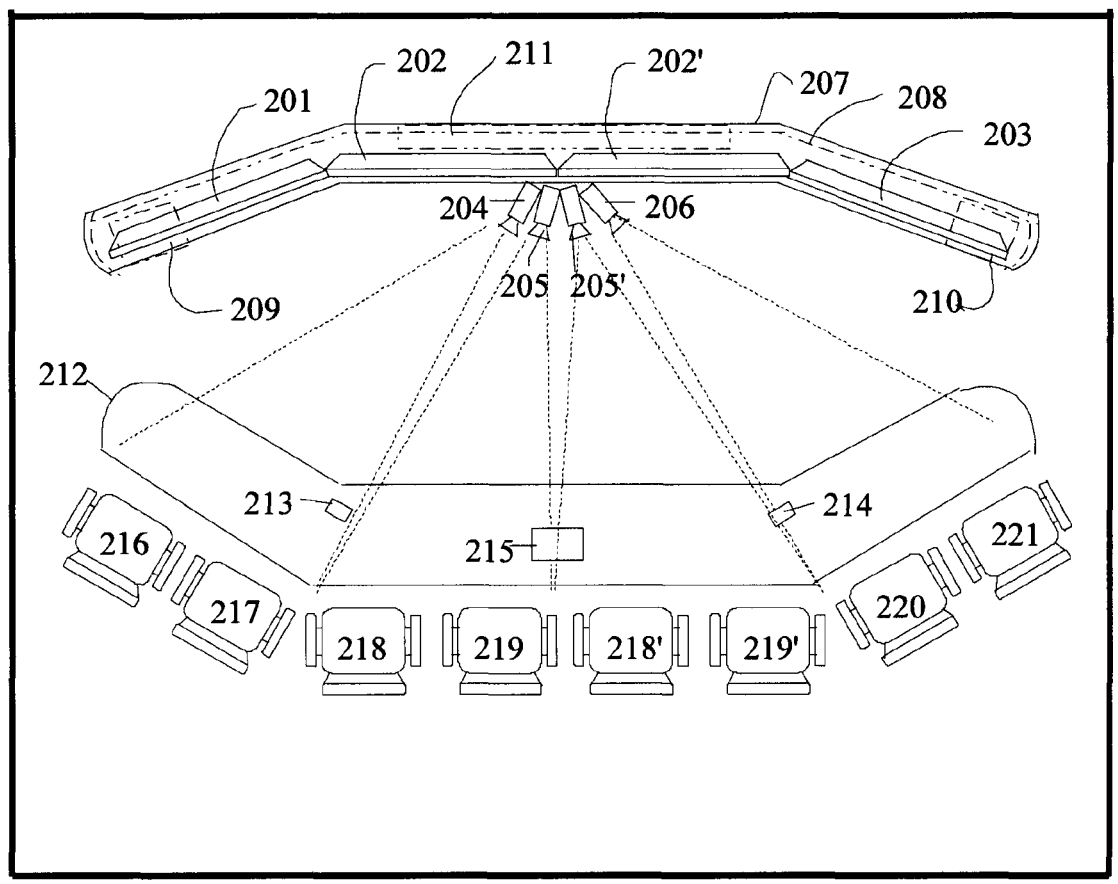
FIG. 3 is a schematic structural diagram of a system having 4 constitutional elements according to Embodiment 1 of the present invention.

In the implementation procedure of this embodiment, three video cameras and three displays are adopted as an example. It may be understood that, the remote presenting system may be designed into a remote presenting system having four displays and four video cameras according to different conference rooms and conference participants. Specifically, referring to FIG. 3, in FIG. 3, it may be seen that, one local display, one video camera, and one conference table are added, and two conference chairs are added. In this way, a display system having four displays and four video cameras is formed, where images of a conference participant 216, a conference participant 217, a conference participant 218, a conference participant 219, a conference participant 218', a conference participant 219', a conference participant 220, and a conference participant 221 are shot by using local video cameras 204, 205, 205', and 206 respectively, and after being stitched and processed, the shot images are transmitted to the multimedia communication remote end. The multimedia communication system remote end is also a display system having four displays and four video cameras.

Figure 4:
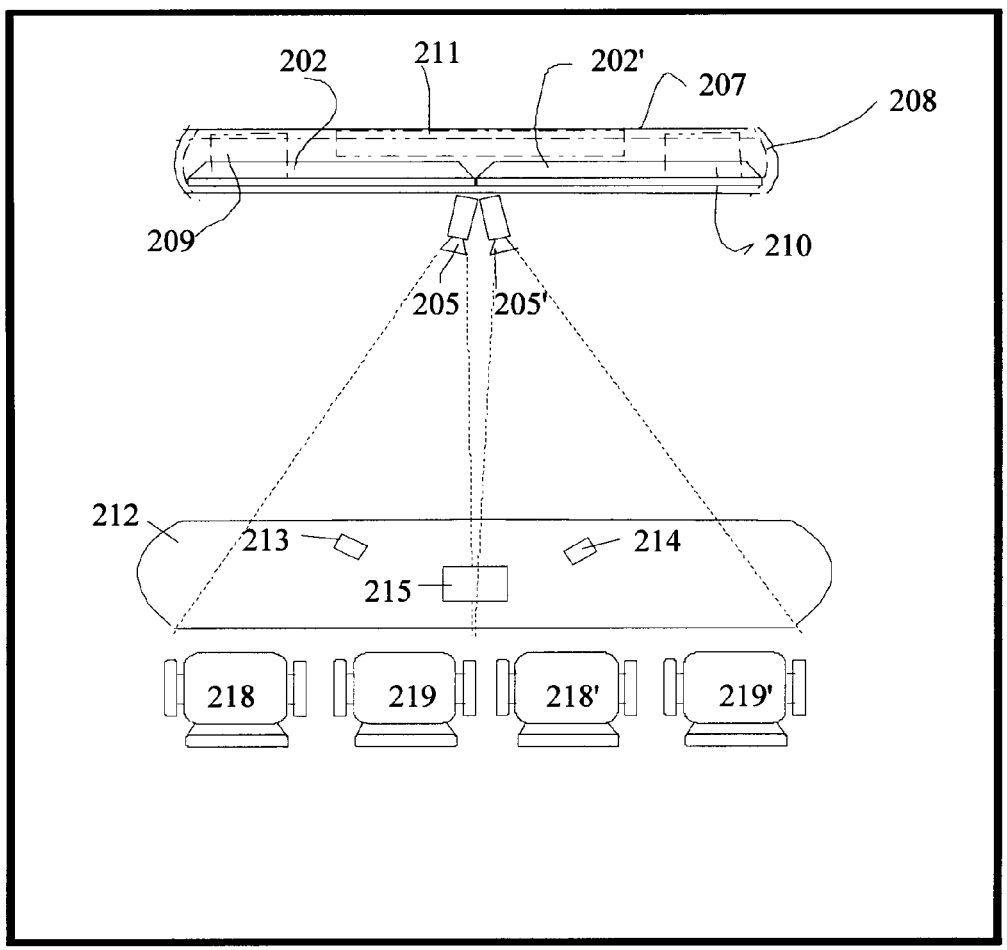
FIG. 4 is a schematic structural diagram of a system having 2 constitutional elements according to Embodiment 1 of the present invention.

For convenience of understanding the concept that the remote presenting system includes a plurality of constitutional elements, in FIG. 4, a remote presenting system including two constitutional elements is provided. In FIG. 4, a display 202 and a display 202' are placed on a presenting platform 207, two video cameras are disposed on the display 202 and the display 202' (where, a video camera 205 and a video camera 205' may be placed on upper frames of the two displays, and may also be placed on a bracket independent of the displays), and the video camera 205 and the video camera 205' obtain a local image. After an audio collection apparatus 213 and an audio collection apparatus 214 obtain local audio data, the multimedia communication terminal 211 of the local end performs processing (which includes pre-processing and coding) on the shot image and the collected sound, the processed image and sound are sent to a remote end communicating with the multimedia communication local end, the multimedia communication terminal 211 of the local end obtains the image and the audio data of the multimedia communication remote end, processes (decodes, and post-processes) the image and the audio data and then transmits the processed image and audio data to the local display 202 and display 202' for displaying, and a local audio output apparatus 209 and a local audio output apparatus 210 output the audio data.

It may be seen from this description that, the embodiment in the present invention is mainly illustrated in a case of three constitutional elements, and it is not difficult for persons skilled in the art to understand that, the embodiment of the present invention may be further applied to a remote presenting system in a plurality of cases of two, four, and five constitutional elements.

Embodiment 2

Figure 5:
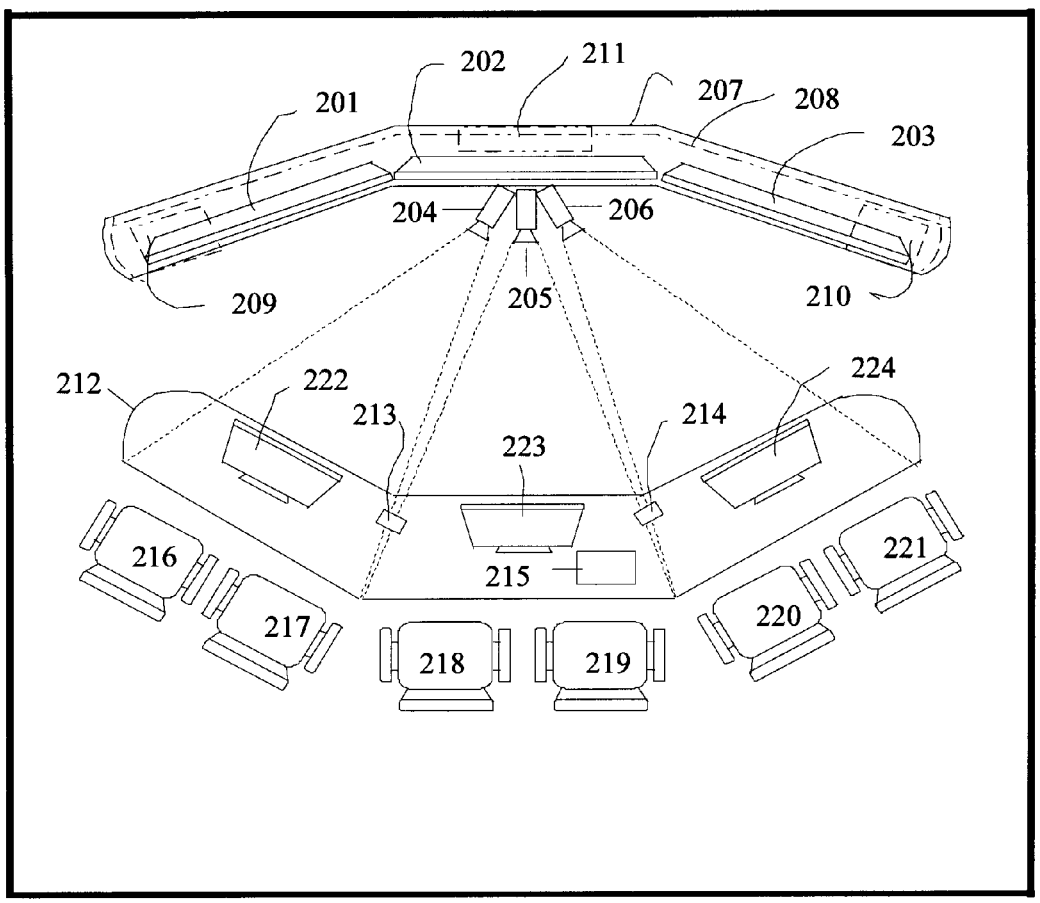
FIG. 5 is a schematic structural diagram of Embodiment 2 of the present invention.

Embodiment 2 of the present invention may be illustrated with reference to FIG. 5.

On the basis of Embodiment 1, three auxiliary displays are added on the conference table 212, namely, an auxiliary display 222, an auxiliary display 223, and an auxiliary display 224, which are configured to display shared multimedia data.

The auxiliary display 222, the auxiliary display 223, and the auxiliary display 224 are connected to the multimedia communication conference terminal 211, and multimedia video data is sent to a local end through the multimedia communication remote end, so that the auxiliary displays display the shared multimedia video data. The auxiliary displays may also be externally connected to other apparatuses, such as a portable computer, so as to display video content output by an externally connected apparatus.

The embodiment of the present invention provides a technical implementation solution of a remote presenting system, so as to have a uniform conference environment, so that participants feel they are located at the same conference site, which thereby ensures experience consistency of different conference sites, and the added auxiliary apparatuses may present the shared data information of a remote end of the remote presenting system (such as a conference presenting slide and a conference topic list), so that users may better participate in the conference.

Embodiment 3

The embodiment of the present invention may be illustrated with reference to FIG. 6.

The embodiment of the present invention is on the basis of Embodiment 1, and the design of multiple rows is added on the layout of the remote presenting system. For convenience of description, on the basis of a single row of conference participants in Embodiment 1, in this embodiment, one row is further added, that is, a conference table 225 is added, meanwhile conference chairs 228, 229, 230, 231, 232, 233, and 234 are added, and two audio collection apparatuses 226 and 227 are added on the conference table 225, and are configured to obtain audio data of the second row. To enable the multimedia communication data to be shared with users of the second row, three auxiliary displays 235, 236, and 237 are further disposed on the conference table 225.

Figure 6:
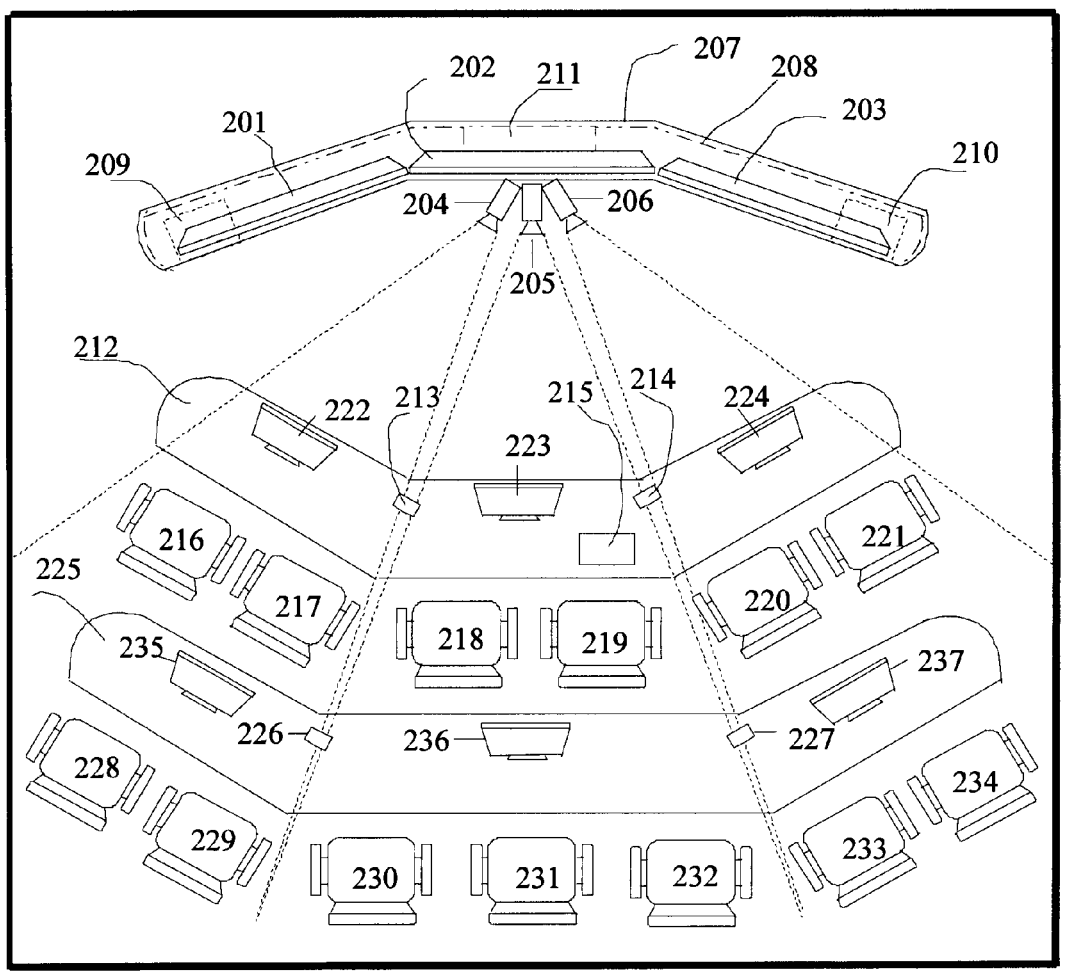
FIG. 6 is a schematic structural diagram of Embodiment 3 of the present invention.

In this embodiment, for convenience of description, in FIG. 6, only one row of conference tables and conference chairs are added. It may be understood that, in the specific implementation procedure of the embodiment of the present invention, multiple rows of conference tables and chairs may be further added, so that the number of conference participants accommodated by the conference is increased.

In this embodiment, because conference chairs of the rear row is far away from the displays 201, 202, and 203, and are obstructed by conference participants of one front row, if the design is further made according to the height of the first row, experience of the users of the rear row is not good. In the embodiment of the present invention, a conference room layout in a step shape is formed by entirely increasing conference tables and chairs of the rear row by a height, and a conference participant of the rear row is located in the middle of two conference participants of the front row as much as possible during the seat design, so that the conference participant of the rear row is not obstructed by the front row, the user of the rear row may have better experience, and the user has a feeling of being located at the same conference site, which thereby ensures experience consistency of different conference sites.

Embodiment 4

Figure 7:
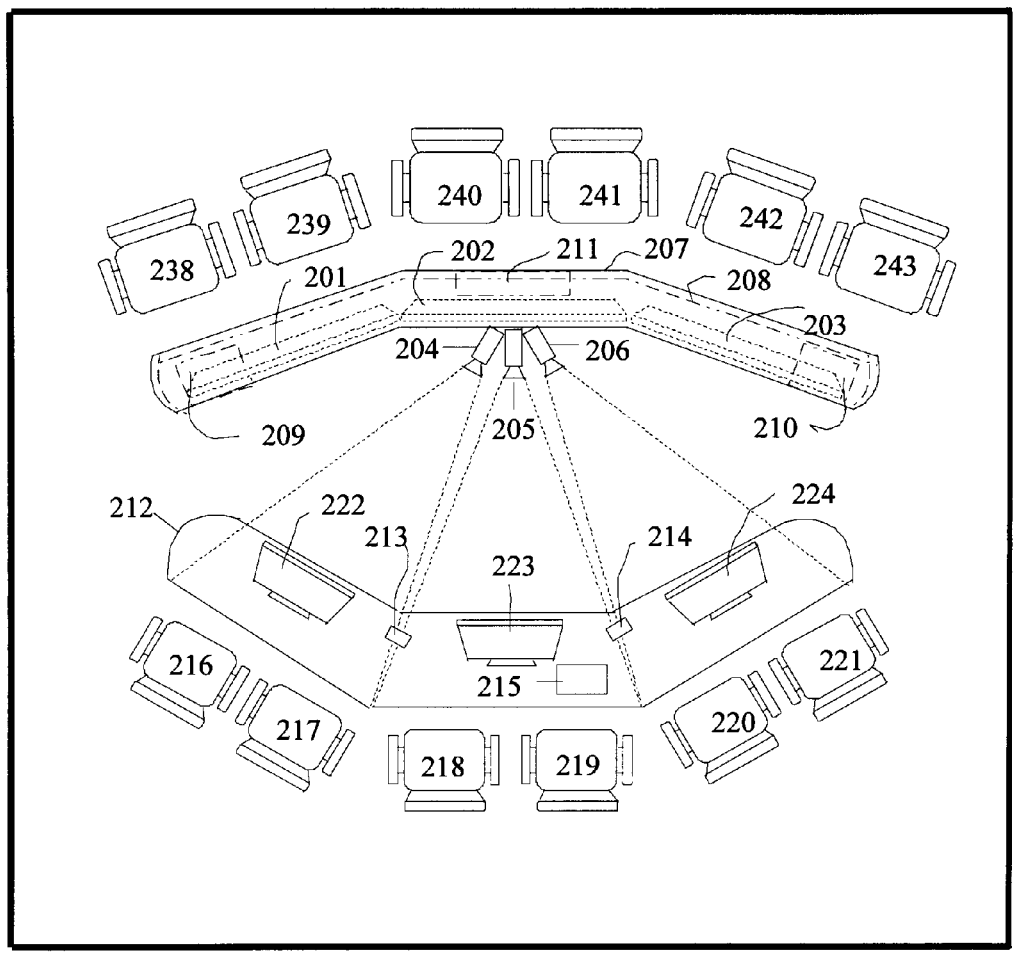
FIG. 7 is a schematic structural diagram of Embodiment 4 of the present invention.

This embodiment may be illustrated with reference to FIG. 7.

Because a conference is usually held in an existing conference room in a manner that conference participants are around a conference table, in order to take blending and transition between the embodiment of the present invention and an existing conference scenario into account, in this embodiment, on the basis of Embodiment 1, the presenting desktop 207 is designed to have the following two functions: (1) acting as a conference table; and (2) acting as a presenting desktop. Referring to FIG. 7, specifically, conference chairs 238, 239, 240, 241, 242, and 243 may be placed at the other side of the presenting desktop 207, and the presenting desktop is designed into a manner that a display may be lifted. When an ordinary conference is held, the displays 201, 202, and 203 are hidden under the presenting desktop 207 by utilizing a lifting device. In this way, the same as an existing ordinary conference, conference participants may sit on the conference chairs 216, 217, 218, 219, 220, 221, 238, 239, 240, 241, 242, and 243 to hold a conference; when a remote conference needs to be held, the displays 201, 202, and 203 are lifted onto the presenting desktop 207 by utilizing the lifting device, and thereby a remote audio/video conference is implemented.

Figure 8:
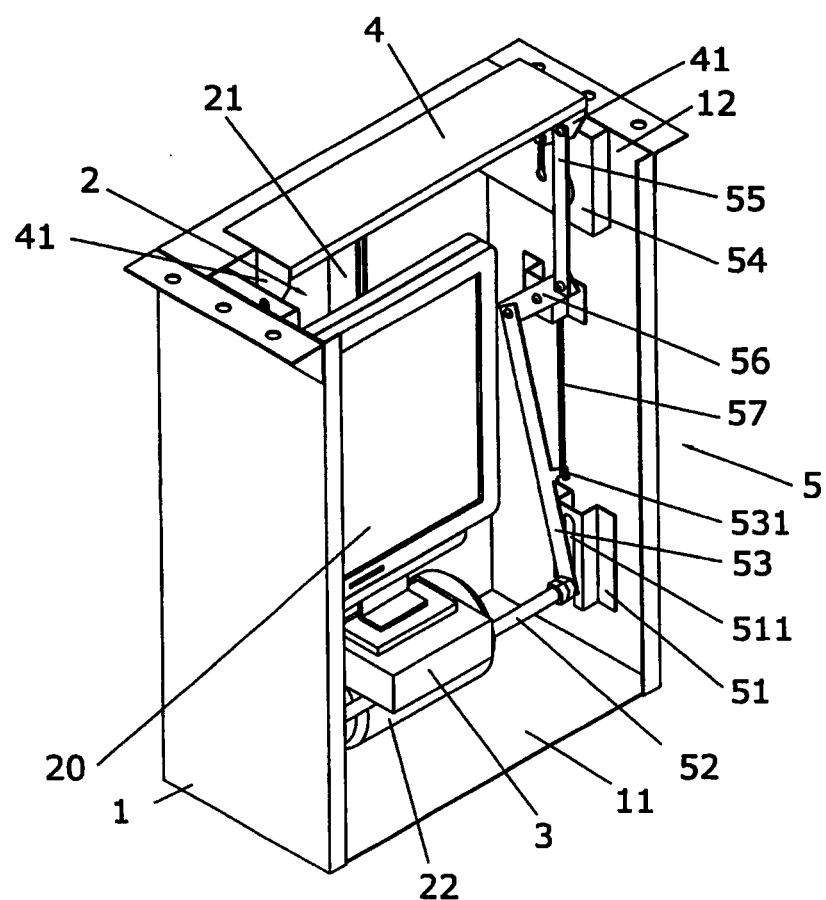
FIG. 8 is a schematic structural diagram of a display lifting device according to Embodiment 4 of the present invention.

In order to simply illustrate the structure of the lifting device, this embodiment illustrates the implementation of the lifting device in a specific implementation manner, and FIG. 8 displays one design manner of a liftable display screen structure. The structure includes a structure body 1 (which may be regarded as a conference table), a lifting device 2, a pedestal 3, a lid 4 and a coupled turnover mechanism 5. The structure body has a hollow part 11, which is disposed under a desktop 10 and has a top opening 12. The lifting device is disposed in the structure body 1, and is formed by a principal axis component 21 which may make a lifting motion and a driving motor 22 which drives the principal axis component to make a lifting motion. The pedestal 3 is fixed on the principal axis component 21, and may fix and support a display 20 to make a lifting motion together with the principal axis component 21. The lid 4 may levelly cover an opening 101 of the desktop 10, and lateral plates 41 are provided at two sides of the lid 4. The coupled turnover mechanism is disposed in the structure body, and may first turn over and then go straight up to cover when the lid is closed or first go straight down and then turn over when the lid is lifted open, so that it is unnecessary to open an excessively large opening in the desktop, so as to maintain the aesthetics of the original desktop, and thereby a disadvantage is overcome that in a conventional lifting structure, an opening equivalent to a display size needs to be dug in the desktop, which greatly damages the desktop aesthetics. It may be understood that, in this embodiment, a lifting device of a display screen is applied to the remote presenting system, so that the remote presenting system may be blended with an ordinary conference system, which thereby saves construction cost of the remote presenting system. In this embodiment, only a structure for implementing the display screen lifting device is listed in order to illustrate the realizability of the remote presenting system more clearly. Persons skilled in the art may understand that, other implementation manners of the lifting device may further exist, and therefore, the embodiment of the present invention should not be construed as a limitation to the protection scope of the present invention.

The embodiment of the present invention may combine an existing ordinary conference with a remote presenting conference, which thereby enhances the compatibility between the two conferences, and saves the construction cost of a conference room, and meanwhile a uniform conference environment is provided, so that participants feel being located at the same conference site, which thereby ensures experience consistency of different conference sites.

Embodiment 5

Content of this embodiment is illustrated with reference to FIG. 9.

In a case of many conference participants, in order to enable a remote conference participant of multimedia communication to correctly pay attention to a current conference participant, it is necessary to add a corresponding apparatus into a remote presenting system to implement a target positioning and tracking function during a conference. In this embodiment, on the basis of Embodiment 1, one video camera is added to implement the target tracking and positioning during the conference, so that a corresponding speaker may be tracked.

Figure 9:
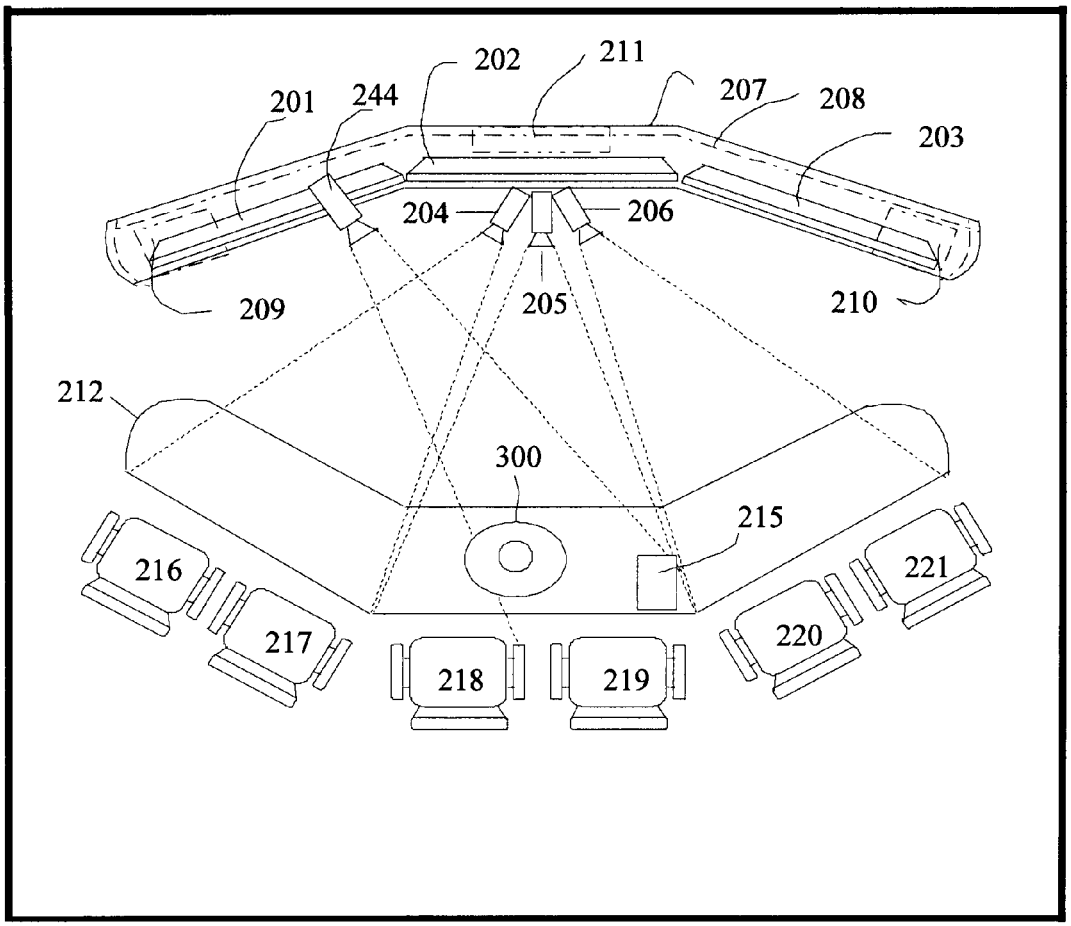
FIG. 9 is a schematic structural diagram of Embodiment 5 of the present invention.

In FIG. 9, a video camera 244 is connected to a multimedia communication terminal 211 hidden in a presenting platform 207, and may implement the target positioning and tracking according to remote demands and a control program of a local video camera.

In FIG. 9, when a conference participant sitting on a conference chair 219 is speaking, the video camera 244 performing the target positioning and tracking is switched to shoot the conference participant. A plurality of methods for controlling the switching of the video camera 244 exists. One method is manual control switching, such as through a remote control, through a pre-defined physical push-button, and through a control interface of a centralized control apparatus 215. Another method is automatic control switching, for example, the location of a speaker may be determined through a sound source positioning algorithm, and thereby a video camera is automatically controlled through a program to shoot the speaker. When it is found that the speaker changes according to the sound source positioning algorithm, the sound source positioning algorithm controls the video camera to perform the shooting switching. The sound source positioning algorithm may adopt a microphone array sound source positioning algorithm, and when a conference participant is speaking in a conference hall, an angle and a distance of the speaker relative to a microphone array 300 may be obtained through the sound source positioning algorithm of the circular microphone array 300. Because the relative location between the target positioning and tracking video camera 244 and the microphone array 300 is known (which is determined when the conference hall is laid out), the relative angle and the relative distance between the speaker and the target positioning and tracking video camera 244 may be calculated. The current location and the shooting visual angle of the target positioning and tracking video camera 244 are known (which are recorded in the target positioning and tracking video camera), so it may be determined whether the video camera 244 has shot the speaker, and how many angles the video camera 244 needs to rotate to shoot the speaker if currently the speaker is not shot; and the relative distance between the speaker and the video camera 244, so as to determine whether the picture shot by the video camera needs to zoom in or out. Motion parameters and focal distance parameters of the video camera are input through a control interface (such as an RS232 serial port) of the target positioning and tracking video camera 244, the video camera 244 may be controlled to perform location switching and picture zooming. In a case that a plurality of persons speaks in a conference hall, in order to prevent the video camera 244 from being frequently switched, a switching time threshold may be set, only if time of continuous occurrence of a sound at the same location exceeds the time threshold, the video camera 244 is switched; if time of continuous occurrence of a sound at the same location does not exceed the time threshold, the video camera is not switched. For example, according to what is shown in FIG. 7, the switching time threshold is set as 5 seconds, and the target shot by the current target positioning and tracking video camera is a conference participant sitting on a conference chair 219, if speaking time of a conference participant currently sitting on the conference chair 217 exceeds 5 seconds, the target positioning and tracking video camera 244 positions the conference participant on the conference chair 217 according to a pickup angle and intensity of the microphone array 300.

Figure 10:
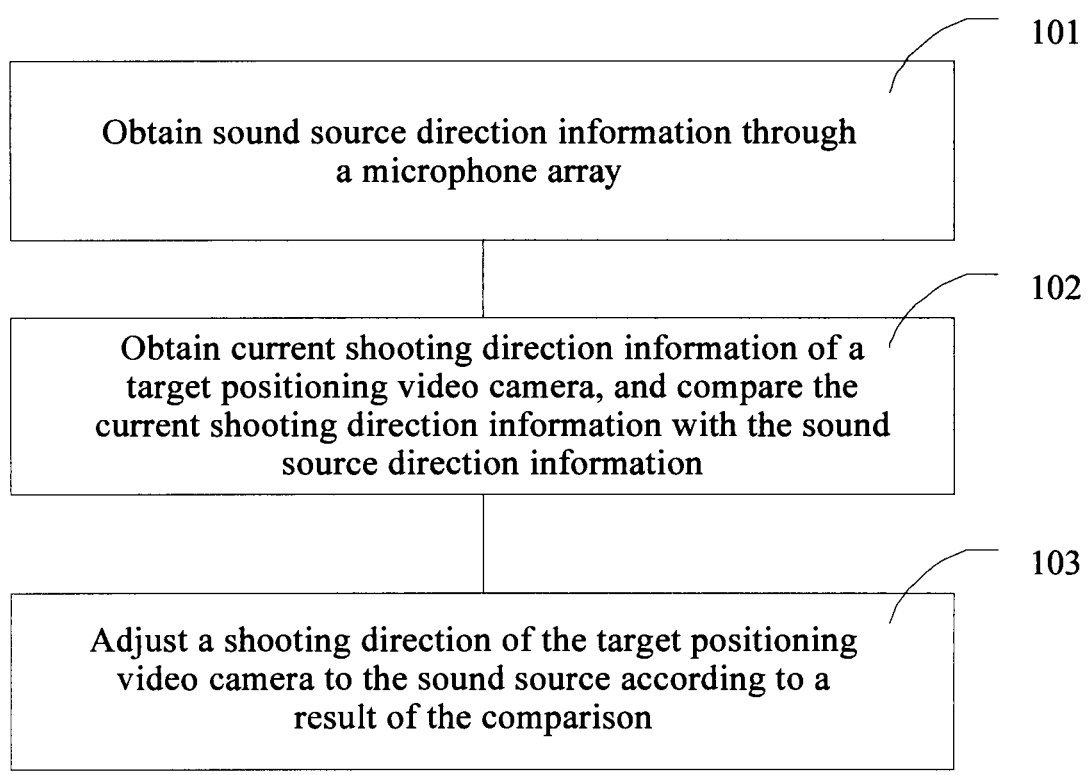
FIG. 10 is a flowchart of a method for controlling target positioning and tracking according to an embodiment of the present invention.

In order to clearly illustrate a target positioning and tracking procedure in the remote presenting system, a method for performing target positioning and tracking by utilizing a target positioning and tracking video camera is provided in the following description, and the method includes the following steps (referring to FIG. 10).

Step 101: Obtain sound source direction information through a microphone array.

Step 102: Obtain current shooting direction information of a target positioning and tracking video camera, and compare the current shooting direction information with the sound source direction information.

Step 103: Adjust a shooting direction of the target positioning and tracking video camera to the sound source according to a result of the comparison.

Alternatively, in order to prevent frequent rotation of the target positioning and tracking video camera caused by frequent switching of speakers in the remote presenting system, by setting a certain time threshold, current shooting direction information of the target positioning and tracking video camera is compared with the sound source direction information, and when time of the timer exceeds the set time threshold, the direction of the target positioning and tracking video camera is adjusted.

A detailed embodiment is adopted for illustration in the following description, and a system diagram shown in FIG. 9 is taken as an example for illustration.

Step 301: The target positioning and tracking video camera 244 starts target positioning and tracking, and in this case, the direction of the target positioning and tracking video camera 244 is aligned to a conference participant on the conference chair 219.

Step 302: When the conference participant on the conference chair 219 stops speaking, and instead, a conference participant on the conference chair 217 begins speaking, in this case, the microphone array 300 calculates direction information of the conference participant on the conference chair 217 by utilizing a sound source positioning algorithm according to collected sound source data.

On the basis of implementing step 302, specifically, when a microphone array is utilized to perform sound source positioning, the following three technologies exist: a controllable beam forming technology based on the maximum output power, an orientation technology based on high resolution spectrum estimation, and a technology based on Time Difference of Arrival (TDOA).

The first method is to perform filtering and weighted sum on voice signals received by the microphone array, and then directly control a microphone to point a direction which enables a beam to have the maximum output power.

The second method is to solve a relevant matrix between microphone signals to determine a direction angle, which thereby determines a sound source location.

The third method is to first determine time differences of the sound reaching microphones at different locations, then utilize the time differences to determine distance differences of the sound reaching the microphones at different locations, and finally determine the sound source location by searching or by using geometry knowledge.

Because the utilizing the microphone array to perform the sound source positioning is a conventional mature technology, the technology is not described in detail again in the present invention.

Step 303: The target positioning and tracking video camera 244 reads its own shooting direction information in this case, and compares the obtained shooting direction information with the sound source direction information obtained by the microphone array through calculation.

Step 304: A comparison result is that, the obtained shooting direction information and the sound source direction information obtained by the microphone array through calculation are different, and relative to the target positioning and tracking video camera 244, the difference between the direction of the current speaker 217 and the current angle of the direction information of the target positioning and tracking video camera is 15 degrees.

Step 305: In this case, the target positioning and tracking video camera 244 starts a timer, and the target positioning and tracking video camera 244 continuously compares the direction of the current speaker 217 with the current direction information of the target positioning and tracking video camera; if such comparison result in Step 304 remains after 5 seconds, the target positioning and tracking video camera 244 is adjusted, and the shooting direction is adjusted to be in alignment with the conference participant on the conference chair 217.

In the foregoing embodiment, the device for implement the target positioning and tracking method is the target positioning and tracking video camera. It may be understood that, such device for controlling target positioning and tracking may be implemented by adopting an independent apparatus. That is, an apparatus independent of the target positioning and tracking video camera is adopted, and the same effect may be achieved.

Figure 11:
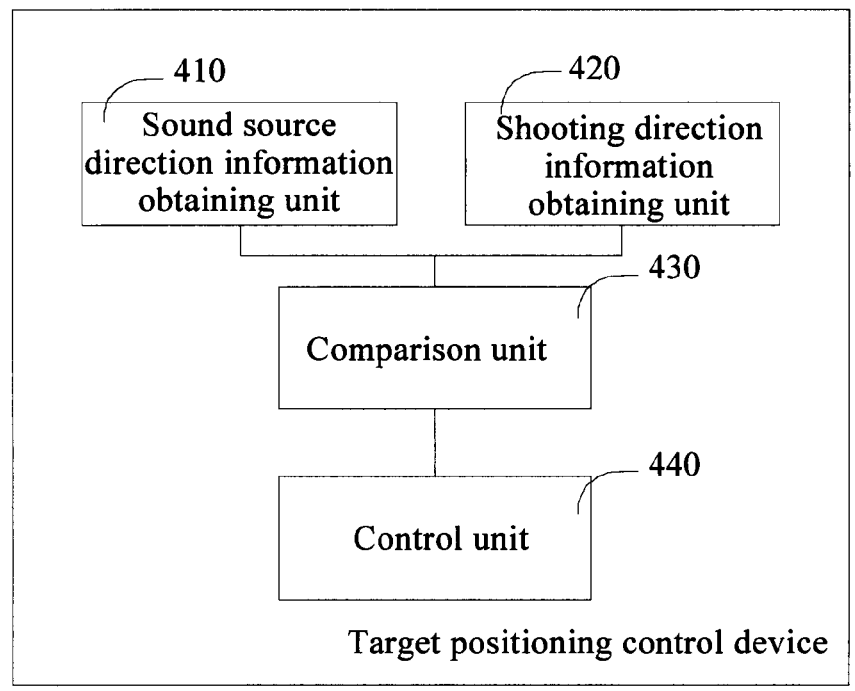
FIG. 11 is a structural diagram of a device for controlling target positioning and tracking according to an embodiment of the present invention.

In the foregoing description, an example is adopted to illustrate the procedure of the method for controlling target positioning and tracking; in the following description, the structure of the device for controlling target positioning and tracking is illustrated through the following embodiment, and referring to FIG. 11, the device for controlling target positioning and tracking includes:

a sound source direction information obtaining unit 410, configured to obtain sound source direction information through a microphone array;

a shooting direction information obtaining unit 420, configured to obtain current shooting direction information of a target positioning and tracking video camera;

a comparison unit 430, configured to compare the sound source direction information with the current shooting direction information; and a control unit 440, configured to generate shooting direction adjustment information of the target positioning and tracking video camera according to a comparison result of the comparison unit.

Figure 12:
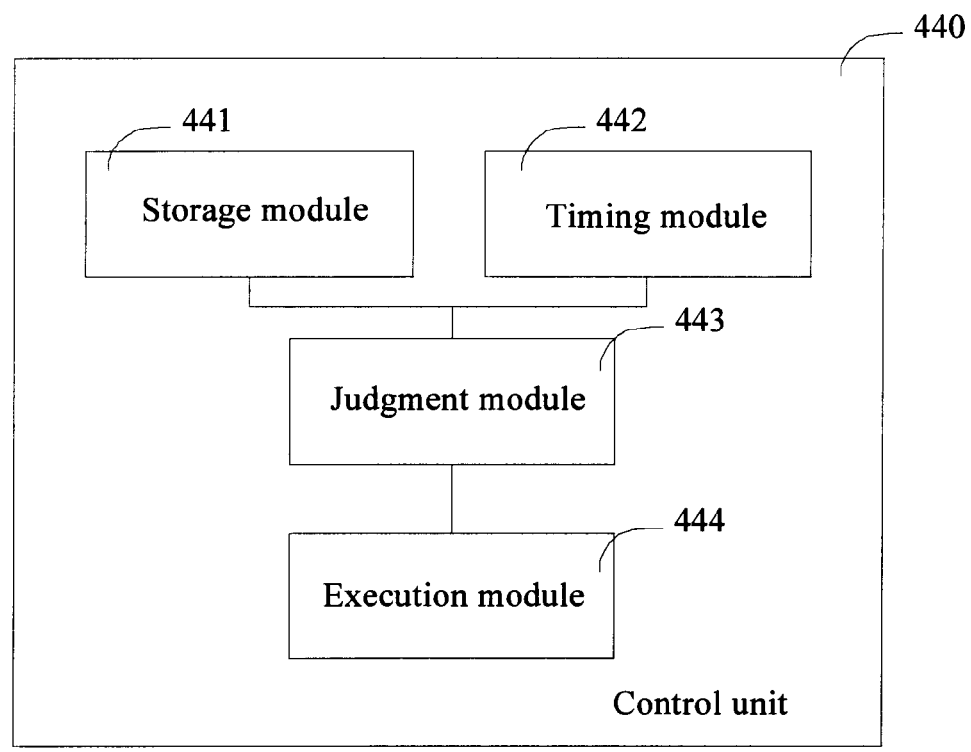
FIG. 12 is a structural diagram of a control unit of the device for controlling target positioning and tracking according to the embodiment of the present invention.

Alternatively, in order to prevent the target positioning and tracking video camera from frequent direction switching due to frequent changes of conference participants, referring to FIG. 12, the control unit 440 may include:

a storage module 441, configured to store a preset time threshold;

a timing module 442, configured to perform timing on the comparing the sound source direction information with the current shooting direction information performed by the comparison unit;

a judgment module 443, configured to compare time in the timing module with the time threshold stored by the storage module, and judge whether a shooting direction of the target positioning and tracking video camera needs to be adjusted; and an execution module 444, configured to generate shooting direction adjustment information of the target positioning and tracking video camera if a judgment result of the judgment module is yes.

It may be seen that, the target positioning and tracking video camera 244 added in this embodiment may be switched according to speaking cases of conference participants in a conference, which thereby positions a current speaker, so as to enable the multimedia communication remote end to pay better attention to the speaking of the current conference participant, and obtain better video communication experience.

Embodiment 6

This embodiment is illustrated with reference to FIG. 13.

Figure 13:
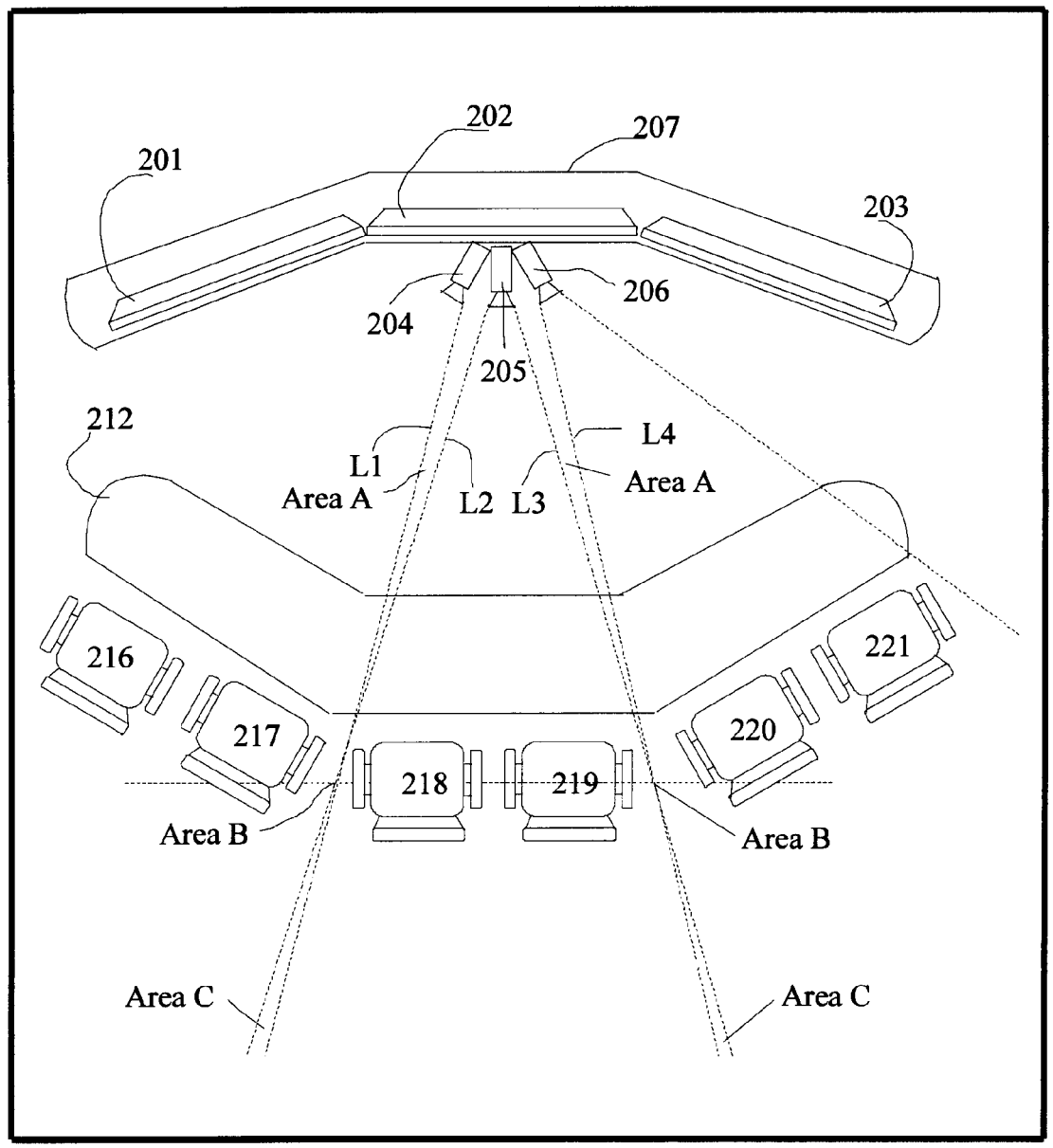
FIG. 13 is a schematic structural diagram of a system at the time of stitching images according to System Embodiment 6 of the present invention.

A structure of a remote presenting system is shown in FIG. 13, where displays 201, 202, and 203 are placed on a presenting desktop 207, video cameras 204, 205, and 206 are disposed at a frame above the display 202, and a conference table 212 and conference chairs 216, 217, 218, 219, 220, and 221 are placed at the other side of the display desktop 207. L1 is a right boundary line of a video shooting zone of the video camera 204, L2 and L3 are left and right boundary lines of a video shooting zone of the video camera 205 respectively, and L4 is a left boundary line of a video shooting zone of the video camera 206. In order to enable a remote conference participant to obtain the optimal seamless image stitching effect, theoretically the video cameras 204, 205, and 206 need to be adjusted so that boundary lines of the video shooting zones of the three video cameras are intersected in the neighborhood of central lines of the local conference chairs 218 and 219. However, practically, as long as an intersection point location exists in the neighborhood of horizontal central lines of the conference chairs 218 and 219, a conference participant at the multimedia communication remote end is enabled to obtain a good image stitching effect, where relative to a local conference participant, a zone A formed in front of the conference table 212 by L1 and L2, or L3 and L4 is an image missing zone, that is to say, a scene in zone A may not be represented on a display of the multimedia communication remote end. At the conference chairs 218 and 219 where local conference participants are located, a zone B exists and is a seamless stitching zone of a local image which the remote end may represent. Relative to the conference participants, a zone C behind them is an image overlapping zone, that is to say, a scene in the local zone C occurs in a remote display in an overlapping manner.

In order to enable the multimedia communication remote end (remote end for short) to obtain a good image stitching effect of the three video cameras 204, 205, and 206 in the multimedia communication local end (local end for short), a certain measure need to be taken to solve the influence on the remote end caused by the zone A and the zone C; in the embodiment of the present invention, a frame of a remote display is utilized to obstruct the zone A and the zone C, so that the zone A and the zone C of an image represented on the remote display is obstructed by a frame of the remote display, which thereby brings a good experience effect to users.

In order to better utilize the frame of the remote display to obstruct the zone A and the zone C existing in the image shooting by the local video camera, by utilizing the frame size of the remote display, the distance from a display to a conference table, the location placement between video cameras, and the range of a shooting visual angle of a video camera, the image missing zone (corresponding to the zone A) and the image overlapping zone (corresponding to the zone C) shot by the local video camera may be just obstructed by the frame of the remote display; in this embodiment, a design method is provided and corresponding design parameters of the remote presenting system is obtained according to the design method.

Figure 14:
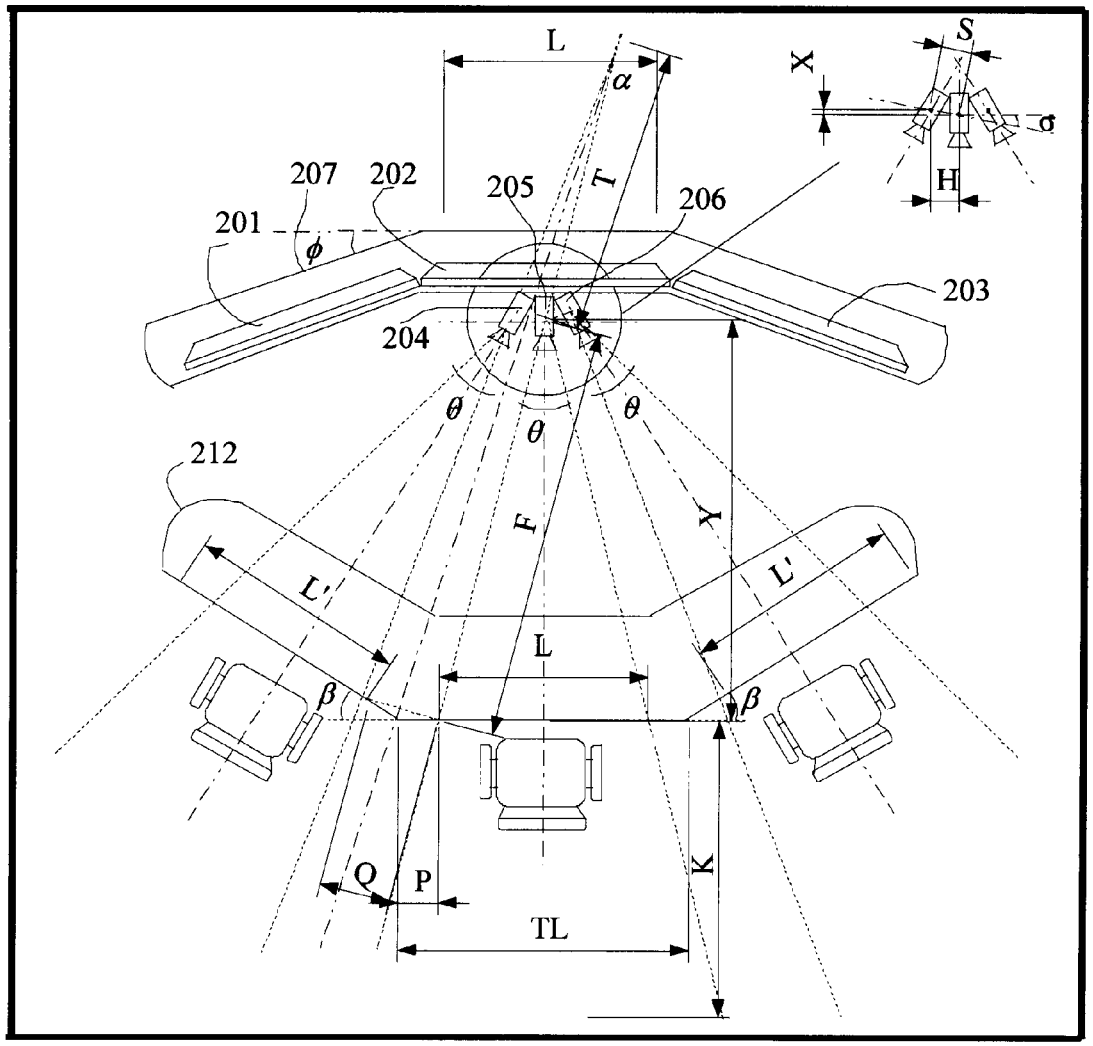
FIG. 14 is a schematic diagram of designing a system parameter according to System Embodiment 6 of the present invention.

Relationships between parameters are shown in FIG. 14, where displays 201, 202, and 203 are placed on a local presenting desktop 207, three video cameras 204, 205, and 206 are placed above a frame of the display 202, a conference table 212 is placed at the other side of the presenting desktop 207. For simplicity and convenience of diagrammatic presentation, only three conference chairs are drawn (not marked in FIG. 12). For convenience of description, a conference participant is used as a description reference object. FIG. 12 is a plane projection of the remote presenting system, where an edge distance Y is the distance from the optical center of the video camera 205 to the external edge of the conference table 212, an included angle $\beta$ is the included angle between the left or right external edge of the conference table 212 and the intermediate external edge, $\theta$ is a shooting visual angle of a single video camera, and L is the length of the external edge of the conference table 212 picked up by a visual cone. In order to enable the three displays 201, 202, and 203 to have the same display effect, values of $\theta$, Y, and L of the three video cameras 204, 205, and 206 are the same. In order to enable external edges of three parts of the conference table 212 to be horizontally stitched in three displays of the multimedia communication remote end, central lines of visual angles $\theta$ of the video cameras should be perpendicular to the external edges of the desktops of the conference table 212, that is, the included angle between the central lines of the visual angles $\theta$ of adjacent video cameras is equal to the included angle $\beta$ between the desktops. It is assumed that the lengths of the frames (including sides of an ineffective screen zone) of the displays 201, 202, and 203 satisfy P=60 mm, and the lengths of the image display zones (effective display zones of the screen) of the displays 201, 202, and 203 satisfy L=1434 mm. S is a spacing between optical centers of the video cameras, H is a horizontal distance between the optical centers, and X is a perpendicular distance between the optical centers. Q is a cutting length of a desktop edge.

It may be known through calculation that, the included angle between internal boundaries of visual cones of adjacent video cameras satisfies $\alpha=\beta-\theta$, $$Q=2*P'*\sin((180-\beta)/2),$$

$$F=Y/\cos(\theta/2),$$

$$T+F=(Q/2)/\sin(\alpha/2).$$

The included angle between a connecting line of optical centers of video cameras and the horizontal line satisfies a $\sigma=\beta/2$. According to computational analysis and experiment, when the value of Y is 2590 mm, the visual realism of the remote presenting system is acceptable. In order to present an image in a true person size, the value of L may be 1434 mm. Theoretically, the value of P' (P is a theoretical value of P') should satisfy P=60 mm, but die to included angles between the displays and deformation of the video cameras, an experimental value of P' is 55 mm, so the length of the external edge of the desktop satisfies TL=1544 mm. It may be calculated through simple geometry knowledge that, the visual angle of a video camera satisfies $\theta$=30.95 degrees, $\alpha$=0.46 degrees, $\beta$=31.41 degrees, Q=105.9 mm, F=2687.41 mm, T=10503.11, S=84.3 mm, H=81.15 mm, and X=22.82 mm. The value range of the visual angle $\theta$ of the video camera is [26°,36°] according to measurement and calculation.

During practical design, in order to ensure that an image represented by a display in the remote presenting system has a true person size, generally a display is selected first, and usually the diagonal dimension of the display is required to be greater than or equal to 60 inches. After the display is selected, the length L of the effective display zone, the length P of the theoretical frame, and the length P' of the practical frame may be determined. Through experiment, a value of Y may be determined according to L, which thereby satisfies the visual realism of the remote presenting system. When a video camera is designed, according to the dimension of the mechanism of the video camera, the distance S between optical centers of video cameras and the included angle $\sigma$ are determined, which thereby deduces $\beta$. It may be determined through a test that, the value range of $\beta$ is usually 29°-37°. After these prerequisites are determined, the parameters in the foregoing drawing may be calculated through a geometry method, which thereby determines a conference room layout. In practical design, a satisfied solution may not be obtained with an initial value, and a desirable layout may be determined finally by adjusting the parameters and through continuous attempt.

According to a calculation result, in the practical implementation, a solution for obtaining a desirable conference room layout is as follows:

| Key Dimension | Specific Value |
| --- | --- |
| Length L of intermediate user zone | 1544 mm |
| Length L' of left/right user zone | 1570 to 1600 mm |
| Included angle $\beta$ between user zones | 31.4 degrees (usually between 29 degrees and 37 degrees) |
| Perpendicular distance between a display and an external edge of a desktop | 2590 mm + 95 mm (distance from a vertex of a visual angle to a television screen) |
| Included angle $\phi$ between the left/right part of a presenting desktop and an intermediate part of the presenting desktop | 15 degrees |
| Height of a conference table | 750 mm |
| Total maximum length of a conference table | <=500 0 mm |
| Total maximum depth of a conference table | <=3200 mm |

It may be seen through the foregoing design that, parameters of a plurality of video cameras of the local end of the remote presenting system, parameters of the conference table, and the dimension of the remote display are set, so that the frame of the remote display of the remote presenting system obstructs the zone A (image missing zone) and the zone C (image overlapping zone) existing in the image shot by the local video cameras, the content represented by a plurality of displays at the remote end is not subject to the influence of the image stitching, that is, the influence of the foregoing two zones brought by scene stitching at different depths is overcome, so that a remote conference participant may see continuous image content.

Figure 15:
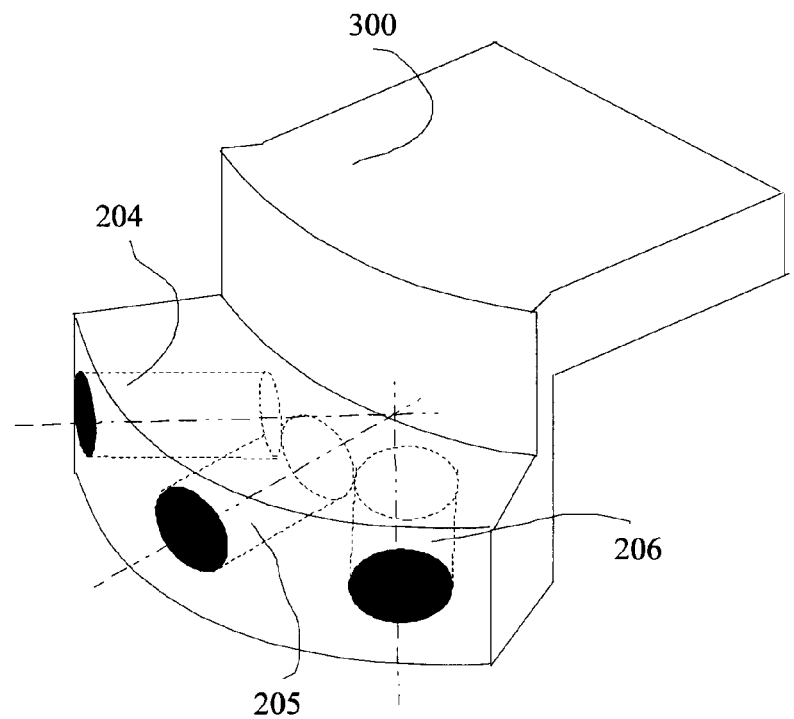
FIG. 15 is a schematic structural diagram of an implementation manner of video cameras according to System Embodiment 6 of the present invention.

For convenience of mounting and adjustment of the three video cameras 204, 205, and 206, these three video cameras may be packaged into one uniform structure 300, as shown in FIG. 15. The location of each video camera may be independently adjusted, such as adjusted through an adjustable screw. When a local scene of the remote presenting system is shot, the entire structure 300 may be placed on the local display 202, and the uniform structure 300 having three video cameras is at a distance from the upper frame of the display 202. In order to shoot the optimal location of a conference participant, the three video cameras are adjusted to be at a small angle tilted downward, which is in a shooting manner of overhead view, and the tilted angle specifically may be decided according to the height of a conference participant and heights of a conference table and a conference chair.

In order to intercommunicate with a conventional multimedia communication system, a panoramic image of the entire conference hall needs to be output. In this embodiment, the method for adding a video camera is not adopted, and instead, shot images of the three video cameras are seamlessly stitched, so as to obtain a panoramic image, and then the panoramic image is coded as a separate path of video stream and sent to the conventional multimedia communication system.

The basic principle of the image stitching algorithm is to estimate interior parameters of a plurality of video cameras and location parameters between the plurality of video cameras, align images of multiple video cameras through an algorithm by utilizing the estimated parameters, eliminate an overlapping zone, and perform processing such as edge blending and parallax removing, and thereby a high resolution panoramic image is obtained. According to the projection geometry principle, the conversion relationship for a three-dimensional point in space to be projected onto an imaging plane of a video camera is:

$$\bar{x} = K[R \mid t]X \quad (1)$$

$$K = \begin{bmatrix} f_x & s & u_0 \\ 0 & f_y & v_0 \\ 0 & 0 & 1 \end{bmatrix} \quad (2)$$

In the equations, $\bar{x}$ is homogeneous presentation of a plane coordinate; X is homogeneous presentation of a world coordinate system; $f_x$ and $f_y$ are equivalent focal distances on horizontal and perpendicular directions; s is a distortion coefficient of an image; $u_0$, $v_0$ is a principal point coordinate of the image. R is a rotation matrix of the video camera, and t is a panning vector of the video camera. K is referred to as an internal reference of the video camera, and R and t are referred to as external references of the video camera. For a plurality of images having an overlapping zone shot by two video cameras or shot by one video camera at different locations, the imaging relationship of one point in the space on two images is:

$$\bar{x}_1 = H_{01}\bar{x}_0 \quad (3)$$

H is a matrix of 3×3, the degree of freedom is 8, which denotes a conversion relationship between two imaging planes, and the matrix is referred to as a homography matrix. For a pure rotation video camera system only having rotation motion or a co-optical-center video camera system, H may be presented as:

$$H_{01} = K_1 R_1 R_0^{-1} K_0^{-1} \quad (4)$$

In this embodiment, through a feature point extraction algorithm, such as a SIFT algorithm, a Harris algorithm, and a SUSAN algorithm, feature point extraction is performed in an overlapping zone of two or more images, a plurality of feature points is found, a match relationship between the feature points is established, a plurality of equation sets is established by utilizing the formula (3), and the homography matrix H between two images is determined through an iteration optimization algorithm. After H is determined, two images may be combined together through coordinate conversion, and pixels of the overlapping zone are aligned. For a video camera model only having the rotation in the horizontal direction, a plane coordinate may be further converted into a cylindrical coordinate by utilizing cylindrical coordinate conversion, and under the cylindrical coordinate, alignment is performed by panning an image. The conversion and the inverse conversion of the cylindrical coordinate are:

$$x' = s\tan^{-1}\frac{x}{f} \quad x = f\tan\frac{x'}{s} \quad (5)$$

$$y' = s\frac{y}{\sqrt{x^2 + f^2}} \quad y = f\frac{y'}{s}\sec\frac{x'}{s} \quad (6)$$

After the image conversion is performed through the foregoing method, usually a desirable seamless panoramic image still may not be obtained, and influence of some other factors has to be taken into account. A main influence factor is the parallax. The parallax at the stitching location may be eliminated through some image processing methods. Another main factor is the difference between the luminance/chrominance of images caused by the exposure/color difference of the video camera, which is particularly apparent at the seaming location of two images. A simple solution is to perform Alpha blending on an overlapping zone at the seaming location, and a good method may be to perform Laplacian pyramid blending or Gradient domain blending on the entire image. After relevant processing is performed, a good panoramic seamless image may be obtained. In practical processing, the width/height ratio of the panoramic image obtained through stitching is very large, so the image without content on the top or bottom after zooming needs to be partially filled, such as black side filling processing.

A single video camera may implement a PTZ operation, and for the video shooting apparatus formed by three video cameras in this embodiment, this embodiment provides an image processing method to implement the PTZ operation that three video cameras shoot an image. The method in one method embodiment includes:

determining a shooting imaging window of a virtual video camera; and performing panning or zooming on an image obtained by shooting and stitching of three video cameras according to the shooting imaging window, and representing the image obtained through panning or zooming in the shooting imaging window.

During the implementation, the performing panning on the image obtained by shooting and stitching of three video cameras according to the shooting imaging window, and the representing the image obtained through panning in the shooting imaging window comprises:

determining a direction and a distance of the panning of the shooting imaging window;

tailoring the image obtained by shooting and stitching of the three video cameras with respect to the direction and the distance of the panning of the shooting imaging window; and using the image obtained by tailoring as an image obtained after the panning of the shooting imaging window.

The performing zooming on the image obtained by shooting and stitching of three video cameras according to the shooting imaging window, and representing the image obtained through zooming in the shooting imaging window comprises:

determining a central location of the shooting imaging window;

obtaining a proportion relationship of the zooming according to the central location;

performing proportional zooming on an image obtained by shooting and stitching of the three video cameras according to the central location, and tailoring the image obtained by shooting and stitching of the three video cameras after the zooming; and using the image obtained by tailoring as an image obtained after the zooming of the shooting imaging window.

This embodiment further provides an apparatus for implementing a PTZ operation of three video cameras, which includes:

a window determination unit, configured to determine a shooting imaging window of a virtual video camera; and an execution unit, configured to perform panning or zooming on an image obtained by shooting and stitching of three video cameras according to the shooting imaging window, and present the image obtained through panning or zooming in the shooting imaging window.

The determination unit comprises:

a measurement sub-unit, configured to determine a direction and a distance of panning of the shooting imaging window and obtain a proportion relationship of zooming; and a tailoring sub-unit, configured to tailor an image obtained by shooting and stitching of the three video cameras after panning or zooming.

The implementation manner of the PTZ specifically may be illustrated by the following specific procedure.

(1) PT (Pan/Tilt) operation: a shooting window of a virtual video camera with a similar shooting resolution to that of a single video camera is defined, tailoring is performed on an original stitched panoramic image with a high resolution, and the content in the window may be regarded as an image shot by the virtual video camera. By moving the window of the virtual video camera upward, downward, to the left, or to the right, the PT operation may be simulated.

The details are illustrated with the following example.

Figure 16:
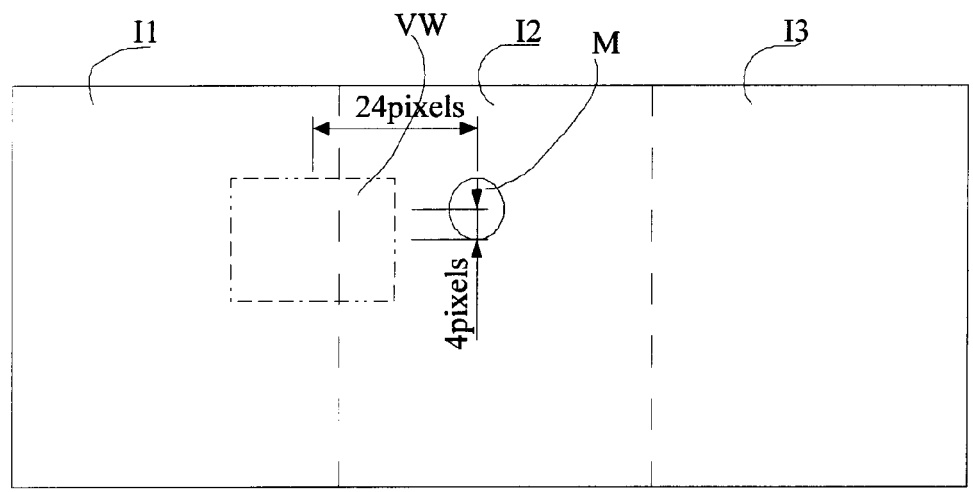
FIG. 16 is a schematic diagram of a state occurring before three video cameras finish a Pan/Tilt operation of a PTZ operation according to System Embodiment 6 of the present invention.
Figure 17:
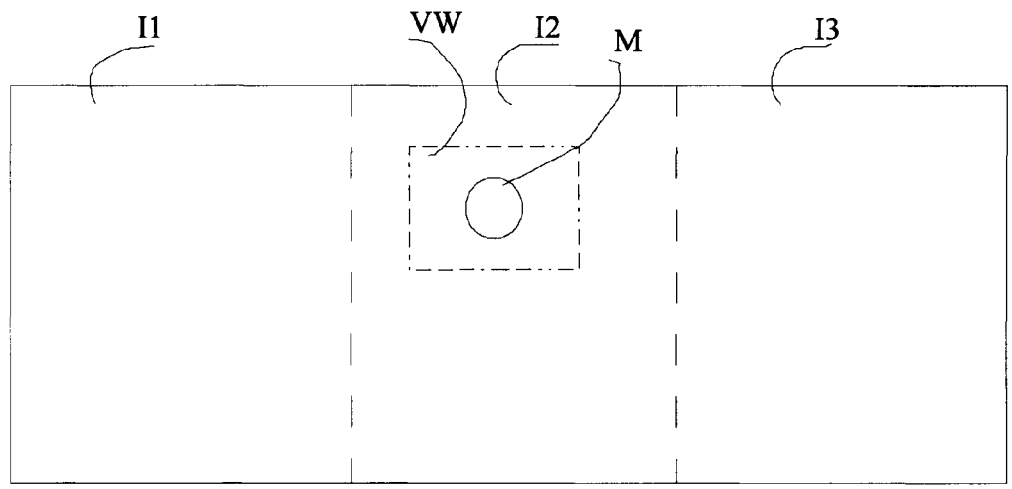
FIG. 17 is a schematic diagram of a result state that three video cameras finish a Pan/Tilt operation of a PTZ operation according to System Embodiment 6 of the present invention.

Referring to FIG. 16, it is assumed that a wide-screen image obtained according to the foregoing image stitching algorithm is formed by three images I1, I2, and I3, a virtual image window VW is defined, the initial location of the image window VW is shown in FIG. 16, and if a remote conference participant intends to watch a target M in the image I2 according to a current resolution, the PT operation needs to be performed, where it is assumed that the distance from the center of the virtual image window VW to the center of the target is [24 pixels, 4 pixels], that is, the virtual image window VW is moved to the right by 24 pixels, and moved upward by 4 pixels, then the content of the image located in the virtual image window is tailored and a target image may be obtained, referring to FIG. 17.

It may be understood that, the numbers involved in the listed example above is used to simply illustrate the PT operation of the video camera so as to obtain an image that the remote end intends to obtain. In the practical procedure, a remote user manually inputs a location of a target to be observed, a PTZ operation software module integrated in the remote multimedia communication terminal finishes the PTZ operation, so that the remote user finds a corresponding target from the wide-screen image on which the image stitching processing is performed.

(2) Z (Zoom) operation: simulation of the zooming operation is similar to digital zooming, which is divided into two cases, one case is the zoom-in processing: after the location of the virtual window is selected, the zoom-in processing is performed on the content in the window (image up-sampling). In the zoom-in procedure, the center of the image after the zoom-in should be maintained overlapping with the center of the virtual window. The part of the original image after the zoom-in which exceeds the virtual window needs to be tailored, and the image preserved in the virtual window is the simulated image obtained after the zoom-in. The other case is the zoom-out processing. In this case, the image beyond the virtual window enters the virtual window, so a virtual window larger than the original virtual window needs to be calculated according to a zoom-out proportion, and then the zoom-out processing is performed on the image in this window (image down-sampling). In the zoom-out procedure, the center of the image should be maintained overlapping with centers of both virtual windows. The image not falling into the original virtual window after the zoom-out needs to be tailored, and the image preserved in the virtual window is the simulated image obtained after the zoom-out.

The details are illustrated with the following example.

Figure 18:
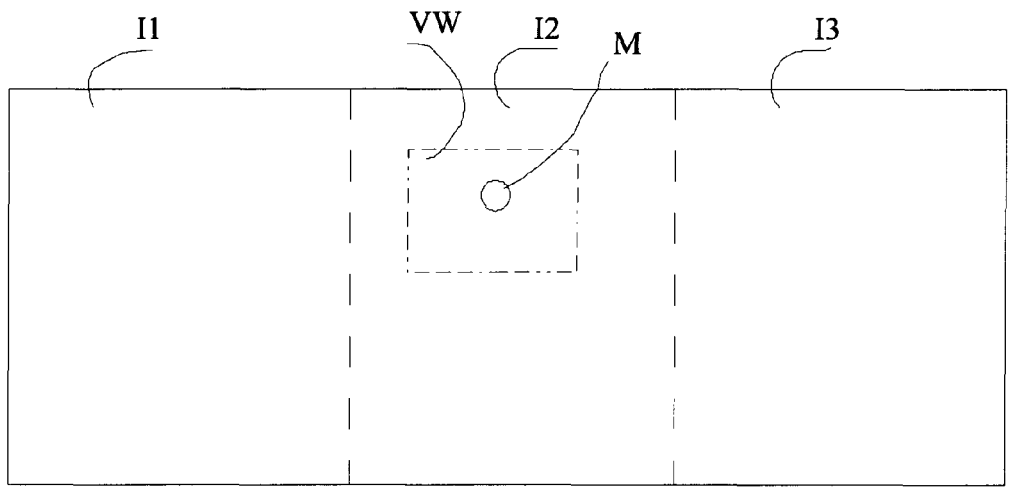
FIG. 18 is a schematic diagram of a state occurring before three video cameras finish a Zooming operation of a PTZ operation according to System Embodiment 6 of the present invention.
Figure 19:
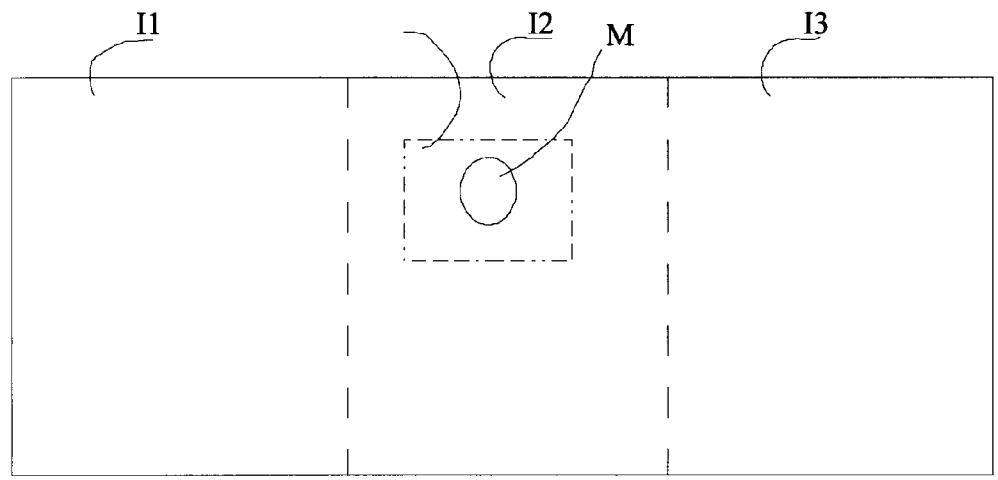
FIG. 19 is a schematic diagram of a result state that three video cameras finish a Zooming operation of a PTZ operation according to System Embodiment 6 of the present invention.

According to FIG. 18, it is assumed that the wide-screen image obtained according to the foregoing image stitching algorithm is formed by three images I1, I2, and I3, a virtual image window VW is defined, and if a remote conference participant intends to watch a target M in the image I2 according to a resolution being 2.5 times of a current resolution, a zoom-in operation needs to be performed, the image pixel interpolation is performed on pixels of the virtual image window, then the content of the image located in the virtual image window is tailored, and a target image may be obtained, referring to FIG. 19.

Likewise, a zoom-out operation is performed on a target, sampling needs to be performed on image pixels in the virtual image window, then the content of the image located in the virtual image window is tailored, and the target image may be obtained. Image interpolating and sampling belong to basic knowledge in the image processing, so the details are not described again in this embodiment.

It may be understood that, the numbers involved in the listed example above is used to simply illustrate the Z operation of the video camera so as to obtain an image that the remote end intends to obtain. In the practical procedure, a remote user manually inputs a zooming proportion value of a target to be observed, a PTZ operation software module integrated in the remote multimedia communication terminal finishes the PTZ operation, so that the remote user finds a corresponding target from a wide-screen image on which the image stitching processing is performed.

Embodiment 7

Figure 20:
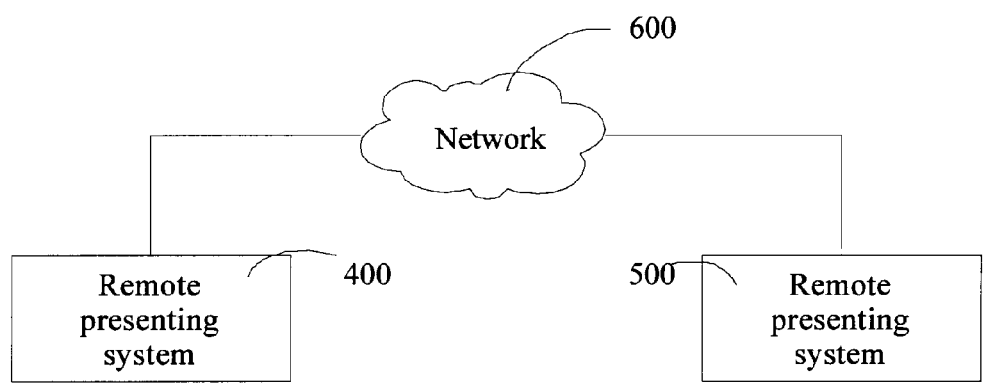
FIG. 20 is a schematic diagram of a communication system formed by remote presenting systems according to System Embodiment 7 of the present invention.

This embodiment may be illustrated with reference to FIG. 20. A communication system of a point-to-point remote presenting system formed by a remote presenting system 400 and a remote presenting system 500 is shown in FIG. 20, wherein each remote presenting system is the remote presenting system based on Embodiment 1, and the two remote presenting systems are connected through a network 600 to form the communication system.

It may be understood that, for the communication system formed by remote presenting systems, the remote presenting systems shown in Embodiment 1, Embodiment 2, Embodiment 3, Embodiment 4, and Embodiment 5 may be further adopted as a single conference hall. Therefore, the communication system of the remote presenting systems is formed.

In the following description, the structure of a communication system is simply illustrated in FIG. 21, and it is assumed that at a certain moment, a remote presenting system 400 is a sending end, a remote presenting system 500 is a receiving end, where according to FIG. 22, the remote presenting system 400 at least has: multiple video cameras 410, a multi-video collection processing unit 420, a multi-video coding unit 430, a microphone array 440, an audio collection processing unit 450, and an audio coding unit 460; the remote presenting system 500 at least has: a multi-video decoding unit 510, a multi-video output processing unit 520, multiple displays 530, an audio decoding unit 540, an audio output processing unit 550, and a speaker array 560. When the remote presenting system 400 transmits local multimedia data to the remote presenting system 500, video data of the conference hall where the remote presenting system 400 is located is shot through the multiple video cameras 410, pre-processing (including: digitizing, buffering, and image de-noising) is performed on a video image shot by the multiple video cameras 410 through the multi-video collection processing unit 420, and then the video data collected by the multi-video collection unit 420 is coded by utilizing the multi-video coding unit 430, and is transmitted to the remote presenting system 500 through a network 600. Likewise, in the remote presenting system 400, the microphone array 440 obtains multiple paths of audio data and audio/video location information of the multiple paths of audio data in the remote presenting system 400, pre-processing (including audio data analogue-to-digital conversion, and noise reduction processing) is performed on the audio data by utilizing the audio collection processing unit 450, audio coding is performed on the collected multiple paths of audio data and the audio/video location information of the multiple paths of audio data through the audio coding unit 460, and likewise, the multiple paths of audio data and the audio/video location information of the multiple paths of audio data are transmitted to the remote presenting system 500 through the network 600.

In this embodiment, the microphone array 440 adopted in the remote presenting system 400 is a system formed by a group of unidirectional microphones placed in a certain geometry structure. Different from collection of a conventional directive microphone, a directive single microphone usually may only collect one path of signal, while a microphone array system may collect multiple paths of signals. Locations of microphones are different, and some differences exist in the collected data in time or space, so required information may be extracted through a signal processing technology for multiple paths of signals. The microphone array system further has a space selection characteristic, and a beam formed by the microphone array system is aligned to a sound source, so as to constrain sounds and environment noises of other speakers, which thereby a high quality sound source signal is obtained.

In this embodiment, at the remote presenting system 500 as the receiving end, the multi-video data stream obtained from the network 600 is decoded by utilizing the multi-video decoding unit 510, display pre-processing (including: buffering, and synchronous processing) is performed on the multi-video data stream through the multi-video output processing unit 520, and then, the video data of the remote presenting system 400 is displayed and output by utilizing the multiple displays 530; likewise, the multiple paths of audio data and the audio/video location information of the multiple paths of audio data received from the network 600 and sent by the remote presenting system 400 are decoded by utilizing the audio decoding unit 540, and corresponding output pre-processing (including: audio data digital-to-analogue conversion, and achieving a virtual sound field by utilizing the audio/video location information of the multiple paths of audio data) is performed on the audio data decoded and obtained by the audio decoding unit 540 through the audio output processing unit 550, and sound field reestablishment and audio output are performed on the multiple paths of processed audio data through the speaker array 560.

During the specific implementation, the distribution direction of a speaker in the speaker array 560 is consistent with the distribution direction of a remote conference participant on a screen. The microphone array 440 of the remote presenting system 400 collects an audio signal of a conference hall, and performs sound source positioning on the sound of an addresser, and performs some audio processing, such as echo cancellation, and noise constraint, so as to output one or more paths of audio signals and location information of the addresser's sound. The speaker array 560 in the remote presenting system 500 performs sound field reestablishment and reproduction according to the input audio signals and location information. The speaker array 560 may combine a plurality of sound field units in some manners so as to perform sound reinforcement. Compared with direct radiation of a single speaker, the speaker array may increase acoustic power, increase acoustic radiation efficiency at low frequency, increase directivity so as to eliminate sound field unevenness, and increase voice articulation in a reverberation environment.

In this embodiment, the sending end and the receiving end in the communication system formed by the remote presenting systems respectively adopt the microphone array and the speaker array when the audio processing is performed, so that the audio/video location information may be better integrated in the audio data, and the audio data may be better represented at the receiving end of the remote presenting system, which thereby brings better experience to users.

Figure 21:
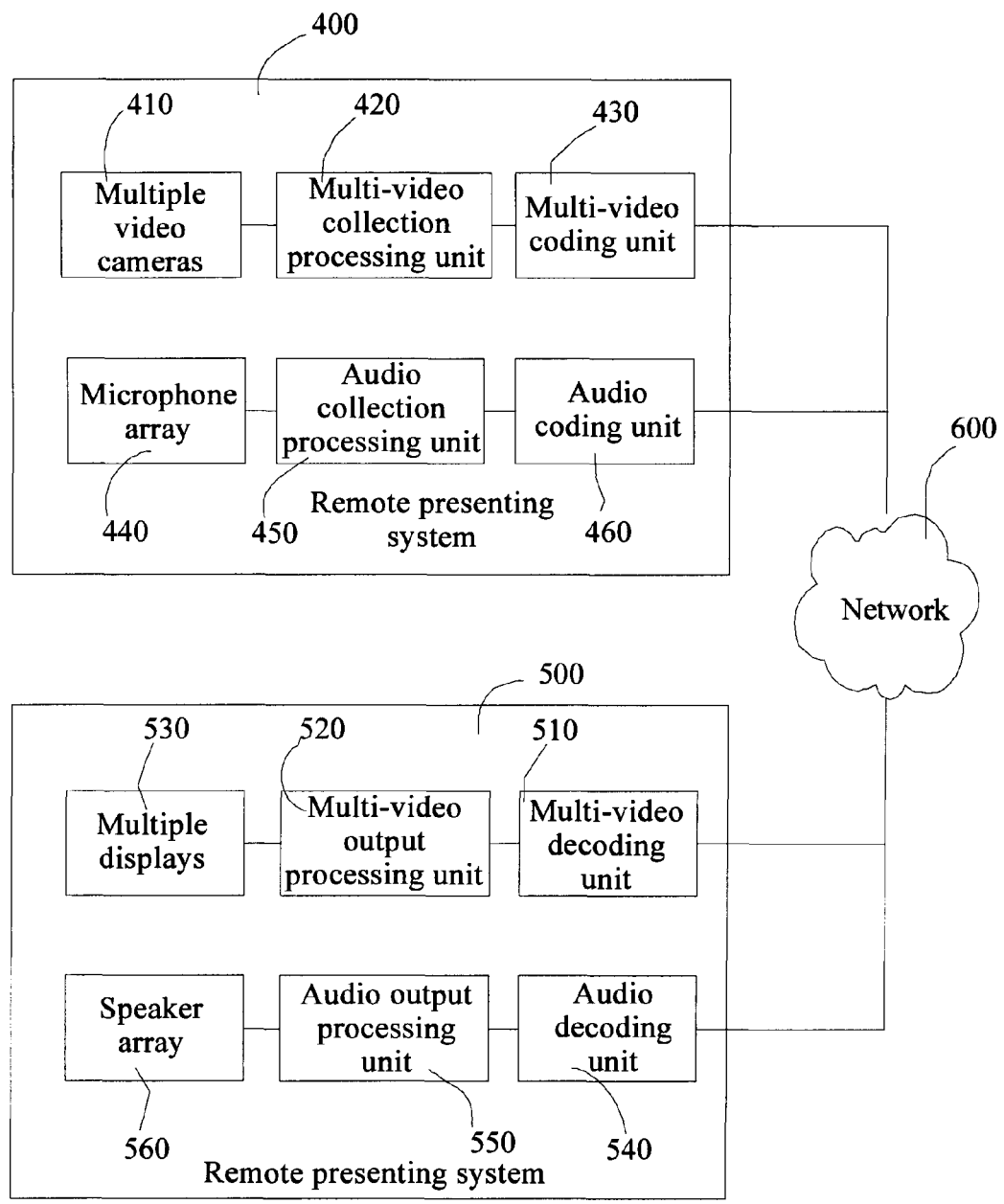
FIG. 21 is a schematic structural diagram of a first implementation manner of a communication system formed by remote presenting systems according to System Embodiment 7 of the present invention.
Figure 22:
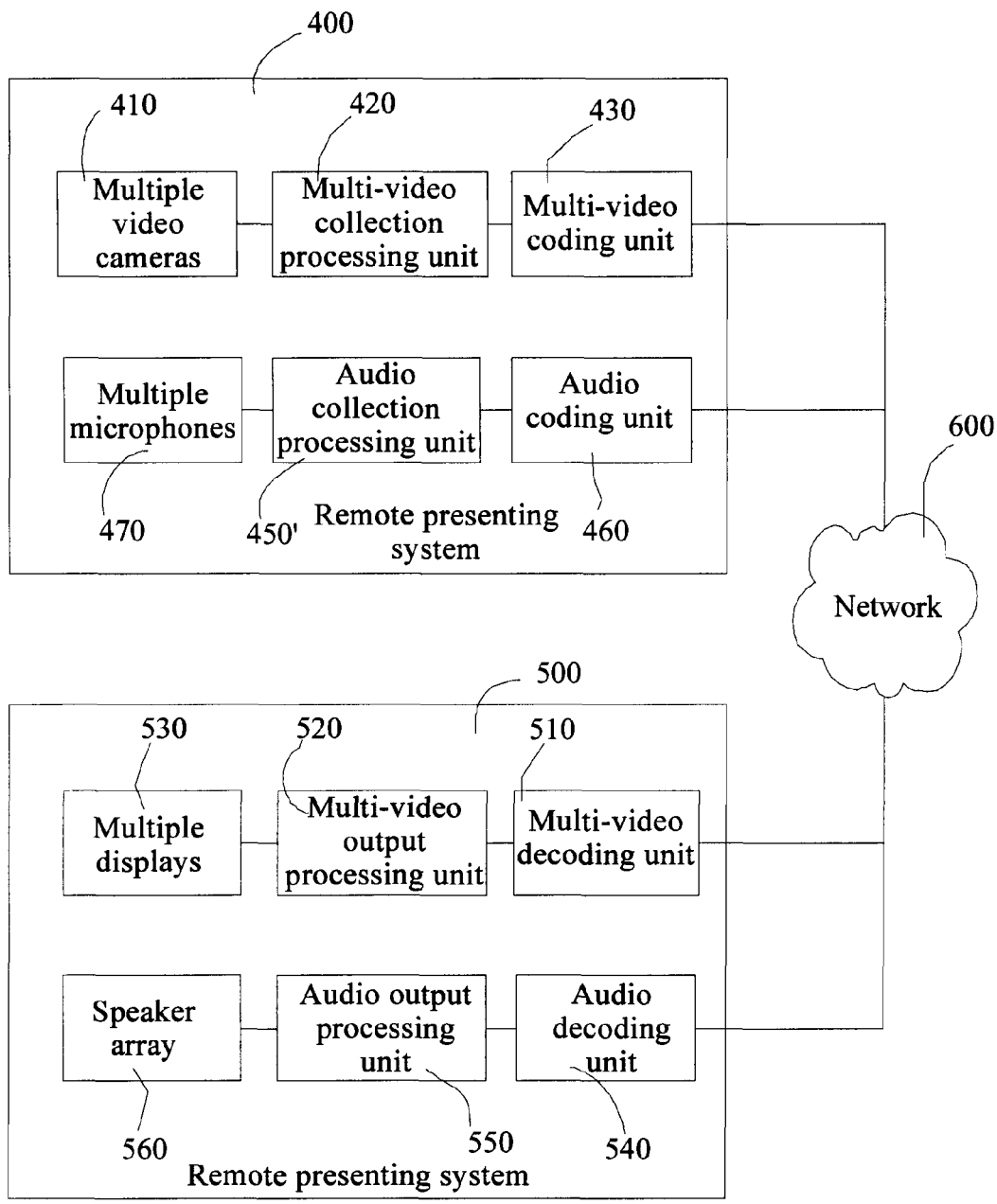
FIG. 22 is a schematic structural diagram of a second implementation manner of a communication system formed by remote presenting systems according to System Embodiment 7 of the present invention.

Definitely, as an alternative solution, on the basis of the embodiment corresponding to FIG. 21, a plurality of ordinary microphones may be further adopted to replace the microphone array, and/or a plurality of ordinary speakers is adopted to replace the speaker array, and in this way, three solutions are further obtained, that is:

(1) Referring to FIG. 22, the remote presenting system 400 adopts a plurality of ordinary microphones 470 having directivity to pick up audio data, and the speaker array 560 is still adopted in the remote presenting system 500 at a remote end. In order to utilize the speaker array 560 to restore the sound field of the remote presenting system 400, an audio/video location obtaining module (not shown) needs to be added into an audio collection processing unit 450', that is, a relative direction of the sound source relative to the multiple microphones 470 is obtained through the location of the multiple microphones 470, then the audio/video location information of the sound source is generated through the audio/video location obtaining module of the audio collection processing unit 450', the audio data information and the audio/video location information of the sound source are coded through the audio coding unit 460, transmitted to the remote presenting system 500 through the network 600, and decoded through the audio decoding unit 540, and the audio data information and the sound source audio/video location information are separated and obtained through the audio output processing unit 550 from the decoded data, and output through the speaker array 560.

Figure 23:
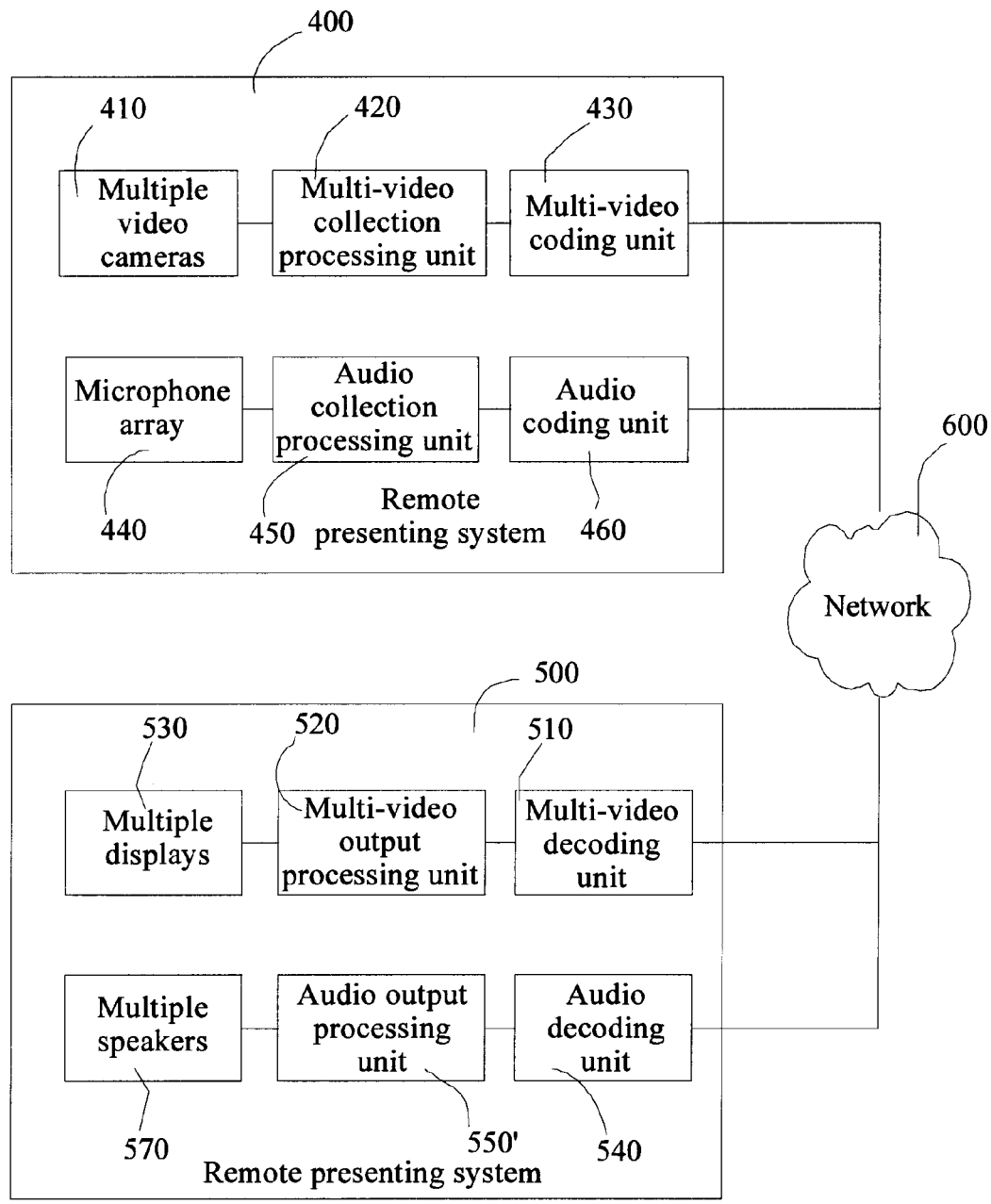
FIG. 23 is a schematic structural diagram of a third implementation manner of a communication system formed by remote presenting systems according to System Embodiment 7 of the present invention.

(2) Referring to FIG. 23, the remote presenting system 400 still adopts the microphone array 440 to pick up the audio data and obtain the audio/video location, a plurality of ordinary speakers 570 is adopted in the remote presenting system 500 at the remote end. In order to enable the speaker 570 to restore the sound field of the remote presenting system 400, the placement location of the multiple speakers 570 needs to be consistent with the direction of the multiple microphones of the remote presenting system 400 during conference hall design, and an audio/video location allocation module (not shown) needs to be added into an audio output processing unit 550', that is, the audio data and the audio/video location information of the sound source are obtained through the microphone array 440, then pre-processing (including audio data analogue-to-digital conversion, and noise reduction processing) is performed on the obtained audio data through the audio collection processing unit 450, the audio data information and the audio/video location information of the sound source are coded through the audio coding unit 460, transmitted to the remote presenting system 500 through the network 600, and decoded through the audio decoding unit 540, and the sound source audio/video location information corresponding to the audio data information is separated from the decoded data through the audio/video location allocation module of the audio output processing unit 550', and output through the plurality of speakers 570.

Figure 24:
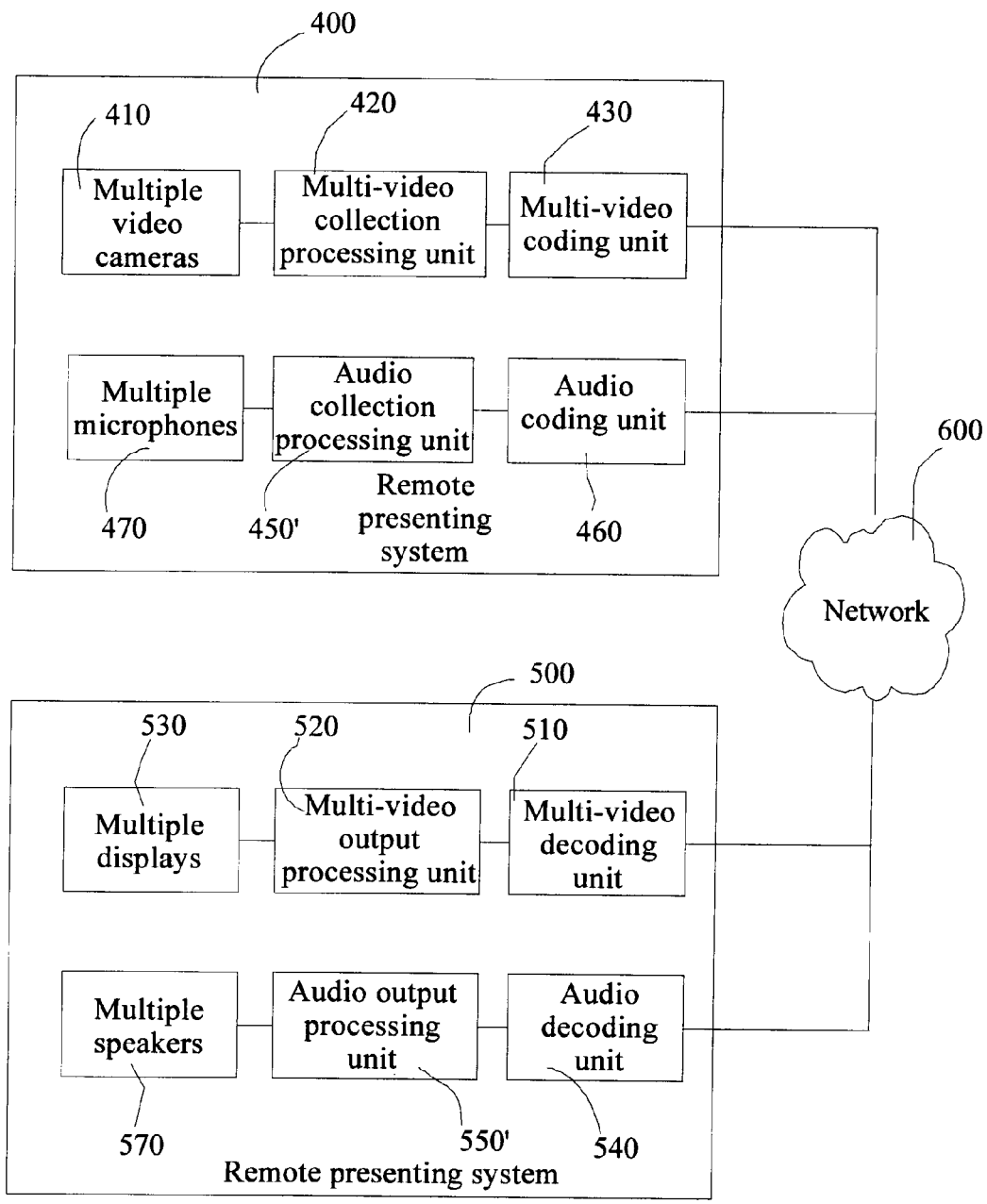
FIG. 24 is a schematic structural diagram of a fourth implementation manner of a communication system formed by remote presenting systems according to System Embodiment 7 of the present invention.

(3) Definitely, another embodiment is further provided. Referring to FIG. 24, that is, the remote presenting system 400 adopts the plurality of ordinary microphones 470 having directivity to pick up audio data, and a plurality of ordinary speakers 570 is adopted in the remote presenting system 500 at the remote end. In order to enable the speakers 570 to restore the sound field of the remote presenting system 400, an audio/video location obtaining module (not shown) needs to be added into the audio collection processing unit 450', the placement location of the multiple speakers 570 needs to be consistent with the direction of multiple microphones of the remote presenting system 400 during conference hall design, and an audio/video location allocation module (not shown) needs to be added into the audio output processing unit 550', that is, a relative direction of the sound source relative to the multiple microphones 470 is obtained through different locations of the multiple microphones 470, and then the audio/video location information of the sound source is generated through the audio/video location obtaining module of the audio collection processing unit 450', and the audio data information and the audio/video location information of the sound source are coded through the audio coding unit 460, transmitted to the remote presenting system 500 through the network 600, and decoded through the audio decoding unit 540, and the sound source audio/video location information corresponding to the audio data information is separated from the decoded data through the audio/video location allocation module of the audio output processing unit 550', and output through the plurality of speakers 570.

It should be noted that, in this embodiment, the numbers of video cameras, microphones and speakers included in the multiple video cameras 410, the multiple microphones 470 and the multiple speakers 570 are respectively greater than one.

In this embodiment, at the same time of obtaining the audio data information, the remote presenting system obtains the sound source audio/video location information, so that the remote presenting system at the receiving end may reconstruct the sound field according to the audio/video location information of the sound source data of the sending end, and a user may have a feeling of being personal on the scene in a video communication procedure, and a local conference participant and a remote conference participant hold a conference in the same conference room, which thereby brings better experience to the users.

Just as in Embodiment 1 of the present invention, not only the remote presenting system with the system structure being 3 is provided, but also the remote presenting systems with the system structures being 2 and 4 are disclosed. It may be understood that, the difference of the remote presenting systems is only embodied in different numbers of elements in the remote presenting systems. For the involved image processing therein, neither the conference room layout method nor the target tracking positioning method changes.

Through the descriptions of the preceding embodiments, persons skilled in the art may understand that the present invention may be implemented by hardware only or by software and a necessary universal hardware platform. However, in most cases, using software and a necessary universal hardware platform are preferred. Based on such understandings, all or part of the technical solutions under the present invention that makes contributions to the prior art may be essentially embodied in the form of a software product. The software product may be stored in a storage medium. The software product includes a number of instructions that enable a computer device (personal computer, server, or network device) to execute the method provided in each embodiment of the present invention.

The above descriptions are merely exemplary embodiments of the present invention, but not intended to limit the scope of the present invention. Any modification, equivalent replacement, or improvement made without departing from the spirit and principle of the present invention should fall within the protection scope of the present invention.

What is claimed is:

1. A remote presenting system, comprising:
a plurality of displays, configured to display image information of a multimedia communication remote end;
an audio output apparatus, configured to output audio information of the multimedia communication remote end;
a multimedia communication terminal, connected to the plurality of displays and the audio output apparatus, and configured to process a video signal and an audio signal of the multimedia communication remote end, and display a video image of a remote end through the plurality of displays, output the audio signal of the multimedia communication remote end and process local audio/video data information through the audio output apparatus, and send the processed audio/video data information to the multimedia communication remote end;
a plurality of video cameras, connected to the multimedia communication terminal, and configured to shoot a video image of a multimedia communication local end, and send the shot video image to the multimedia communication terminal for processing;
an audio collection apparatus, connected to the multimedia communication terminal, and configured to collect audio information of the multimedia communication local end, and send the collected audio information to the multimedia communication terminal; and
a plurality of user locations, corresponding to the plurality of video cameras respectively, wherein visual field perpendicular planes of the plurality of user locations are respectively in an approximately perpendicular relationship with optic axes of camera lenses of the plurality of video cameras; and wherein the displays are placed on a presenting desktop, the video cameras are disposed at a frame above the displays, and a conference table and conference chairs are placed at the other side of the display desktop; by utilizing the frame size of the remote display, the distance from a display to a conference table, the location placement between video cameras, and the range of a shooting visual angel of a video cameras, the image missing zone and the image overlapping zone shot by the remote video camera may be just obstructed by the frame of the local display.

2. The system according to claim 1, wherein parameters of the plurality of video cameras of the system, parameters of the user locations, and dimensions of the remote displays are set, so that content represented by the plurality of remote displays looks like being continuous.

3. The system according to claim 1, wherein an included angle of a shooting range of each video camera of the plurality of video cameras is determined by a ratio of the width of a user location corresponding to the video camera to the distance from an optical center of the video camera to the user location, and a range of the included angle is [26°, 36°].

4. The system according to claim 1, wherein a range of an included angle between principal optic axes of every two adjacent video cameras of the plurality of video cameras is [29°, 37°].

5. The system according to claim 1, wherein the audio collection apparatus is two microphones, and the audio output apparatus is two speakers.

6. The system according to claim 1, wherein the plurality of user locations is placed in a manner of multiple rows.

7. The system according to claim 6, wherein the user locations placed in the manner of multiple rows are placed in a step manner.

8. The system according to claim 1, wherein the plurality of displays is placed on a presenting desktop, and a back of a presenting direction of the presenting desktop is used to mount a user seat, wherein the plurality of displays on the presenting desktop can be placed into the presenting desktop in a lifting manner.

9. The system according to claim 1, further comprising: a video camera, configured to perform target positioning and tracking on a speaking conference participant.

10. The system according to claim 1, wherein the audio collection apparatus is a microphone array, and the microphone array is configured to collect audio information in a conference hall and perform sound source positioning on the audio information; the audio output apparatus is a speaker array, and the speaker array is configured to reestablish and reproduce a sound field according to the received audio information of the multimedia communication remote end and sound source location information.

11. The system according to claim 1, wherein the audio collection apparatus is a microphone array, and the microphone array is configured to collect audio information in a conference hall and perform sound source positioning on the audio information; the audio output apparatus is a plurality of speakers, and the plurality of speakers is configured to output the received audio information of the multimedia communication remote end.

12. The system according to claim 1, wherein the audio collection apparatus is a plurality of microphones, and the plurality of microphones is configured to collect audio information in a conference hall; the audio output apparatus is a speaker array, the speaker array is configured to reestablish and reproduce a sound field according to the received audio information of the multimedia communication remote end and sound source location information.

13. The system according to claim 1, wherein the displays are displays having a diagonal dimension greater than or equal to 60 inches.

14. The system according to claim 1, wherein a plurality of auxiliary displays is placed on a conference table disposed at the plurality of user locations, and the auxiliary displays are configured to display shared multimedia data information.

15. The system according to claim 14, wherein the auxiliary displays can be hidden into the conference table in a lifting manner.

16. The system according to claim 14, wherein a centralized control apparatus is disposed on the conference table, and the centralized control apparatus is connected to the multimedia communication terminal, and is configured to implement control on multimedia communication.

17. The system according to claim 16, wherein the centralized control apparatus is configured to set up or release a call, set a system parameter, adjust lighting of a conference room, and control window curtains of the conference room.

18. A method for setting parameters of the remote representation system according to claim 1, comprising:
determining the width of a scene shot by a video camera according to a size of a representation plane of a display;
determining a shooting visual angle of the video camera according to the width of the scene shot by the video camera and a distance between a perpendicular plane of an optical center of the video camera and a visual field perpendicular plane of a user location;
determining an imaging included angle between every two video cameras according to an included angle between principal optic axes of every two video cameras and the shooting visual angles of the video cameras; and
determining a distance between boundaries of shooting visual angles of adjacent video cameras according to the width of a frame of a display of the multimedia communication local end and an included angle between principal optic axes between every two video cameras, wherein the distance between the boundaries of the shooting visual angles of the adjacent video cameras is used as a dimension of a frame of the multimedia communication remote end.

* * * * *